(12) United States Patent
Bankes

(10) Patent No.: US 6,389,380 B1
(45) Date of Patent: May 14, 2002

(54) SYSTEM AND METHOD FOR PERFORMING COMPOUND COMPUTATIONAL EXPERIMENTS

(75) Inventor: Steven C. Bankes, Los Angeles, CA (US)

(73) Assignee: Evolving Logic Associates, Topanga, CA (US)

( * ) Notice: Subject to any disclaimer, the term of this patent is extended or adjusted under 35 U.S.C. 154(b) by 0 days.

(21) Appl. No.: 09/154,606

(22) Filed: Sep. 16, 1998

Related U.S. Application Data

(60) Provisional application No. 60/058,957, filed on Sep. 16, 1997.

(51) Int. Cl.⁷ ............................. G06F 17/50; G06G 7/62
(52) U.S. Cl. ................................. 703/17; 703/2; 703/1; 706/45
(58) Field of Search ......................... 703/1, 2, 6, 13–22; 706/45

(56) References Cited

U.S. PATENT DOCUMENTS 6,044,212 A * 3/2000 Flavin et al. ................. 703/13
6,081,798 A * 6/2000 Johnson et al. ............... 706/54

OTHER PUBLICATIONS

Steve Bankes, Exploratory Modeling for Policy Analysis, 41 Operations Research, No. 3, 435–499 (May–Jun. 1993).
Steven Banks & James Gillogly, Exploratory Modeling, Search Through Spaces of Computational Experiments, Proceedings of the Third Annual Conference on Evolutionary Programming 353–60 (Anthony V. Sebald & Lawrence J. Fogel eds. 1994).
Steve Bankes & James Gillogly, Validation of Exploratory Modeling, Proceeding of the Conference on High Performance Computing 1994 382–87 (Adrian M. Tentner & Rick L. Stevens eds. 1994) (San Diego, CA).
Arthur Brooks et al., Weapon Mix and Exploratory Analysis, A Case Study (1997) (ISBN: 0–8330–2535–X).
Steven C. Bankes, Computational Experiments and Exploratory Modeling, 7 Chance No. 1, 50–51, 57 (1994).
Charles Seiter, Evolver Answers Questions That Excel Can't, PC World (Nov. 1998).

* cited by examiner

Primary Examiner—Kevin J. Teska
Assistant Examiner—Samuel Broda
(74) Attorney, Agent, or Firm—Knobbe, Martens, Olson & Bear, LLP

(57) ABSTRACT

A system and method for performing compound computational experiments include an experiment having at least one input. The experiment includes a process controllable by a computer and responsive to the input to produce at least one output, the output capable of being stored on a medium readable by the computer. The system includes a generator capable of running on the computer. The generator automates the performance of a plurality of experiments and automatically varies the inputs for the experiments. An outcome store of the system stores the outputs on the computer-readable medium. The system also includes a display capable of running on the computer. The display presents an interpretation of a set of the outputs extracted from the outcome store. The display is responsive to user input to alter the interpretation, to present an interpretation of a different set of outputs, or to cause the generator to perform a plurality of experiments.

43 Claims, 13 Drawing Sheets

SYSTEM AND METHOD FOR PERFORMING COMPOUND COMPUTATIONAL EXPERIMENTS

PRIORITY CLAIM

This application claims the benefit of U.S. Provisional Application No. 60/058,957, filed Sep. 16, 1997.

BACKGROUND OF THE INVENTION

1. Field of the Invention

This invention relates to computer-assisted reasoning. More specifically, the invention provides a system and method for exploring solutions to complex problems by automatically generating multiple series of experiments, by permitting users to visualize outcomes of experiments, and by allowing users to easily generate additional series of experiments using differing input dimensions or solution strategies.

2. Description of the Related Art

People increasingly use computer-based calculations to help reason about complex problems in many fields, from scientific research to engineering design to business operations and planning. Yet, despite enormous improvements in computer capabilities over past decades, people still generally use computers to support the same style of quantitative reasoning they used before computers existed.

Even so, existing computer applications often perform calculations which produce results not obvious to the computer user. Such calculations can be considered experiments. The following are examples of experiments: a simulation model which projects the future course of the economy, a spreadsheet which combines disparate accounts into a profit and loss statement, a statistical routine which finds a pattern in a large database of chemical reaction outcomes (data mining,) a search over networked databases or the World Wide Web, and computer controlled physical experiments such as combining two chemicals to measure their reactivity. In contrast, a word processing program that displays keystrokes and places them into a computer file or a numerically controlled machine are not experiments.

Some computer applications perform several iterations of an experiment. For instance, many optimization routines can be used to make repeated calls to a simulation model in order to find the inputs which give the most desirable output. To date, however, users generally use computers to conduct iterations of experiments that are simple to specify analytically, such as by an optimization routine.

Recent studies suggested that a number of important, very difficult, and previously intractable problems can be approached by conducting a series of experiments directed to the problem. Such series of experiments, or compound experiments, can be extremely difficult and time-consuming to design and build. Thus, it has been exceedingly difficult to exploit the power of compound experiments, and the benefits have been difficult to perceive. Because of the prohibitive costs, it is simply not recognized how profoundly systematic compound experiments can enhance the analysis of previously intractable problems.

For example, computer models of the future economy and climate have been developed to answer questions phrased as optimization problems, such as, "what is the most cost-effective policy response, assuming we can accurately characterize the future behavior of the climate and economy over the next century." While these models contain much useful information, they unfortunately lack the power to make accurate predictions in the face of numerous uncertainties and overwhelming complexity. Moreover, such direct policy questions may have no resolvable answer.

On the other hand, compound experiments can be used to devise robust policies that provide reasonably good results, no matter what predictions of the future turn out to be true. This sort of approach has produced useful results in isolated cases for various business and public policy problems.

Compound experiments are a crucial tool for supporting the reasoning that can lead to understanding very complex systems. To date, however, the great cost in time and human labor to construct compound experiments has largely limited their use to only the simplest problems. Moreover, there has simply been no support for conducting large numbers of experiments automatically driven by the needs of a specific reasoning strategy.

What is needed is a general-purpose mechanism that allows the construction of a wide variety of systems that support reasoning about complex and uncertain problems using compound experiments.

SUMMARY OF THE INVENTION

One embodiment of the present invention is a system for performing compound computational experiments. The system comprises (1) an experiment having at least one input, the experiment including a process controllable by a computer, the process responsive to the at least one input to produce at least one output, the at least one output capable of being stored on a medium readable by the computer; (2) a generator capable of running on the computer, the generator automating the performance of a plurality of the experiments, the generator automatically varying the inputs for the experiments; (3) an outcomeStore storing the outputs on the medium; and (4) a display capable of running on the computer, the display presenting an interpretation of a set of the outputs extracted from the outcomeStore, the display responsive to user input to alter the interpretation, to present an interpretation of a different set of the outputs, or to cause the generator to perform a plurality of the experiments. A preferred aspect of the system further comprises a dispatch capable of running on the computer, the computer being one of a plurality of networked computers, the dispatch causing a first experiment to run on a first of the networked computers and causing a second experiment to run on a second of the networked computers. Another aspect of the system further comprises a dispatch capable of running on the computer, the dispatch causing each of the experiments to be run on a computer upon determining, by examining data in the outcomeStore, that the experiment has not previously been run. A still further aspect of the system is one wherein (1) the process includes first and second sub-models such that each of the experiments uses either the first sub-model or the second sub-model, the first sub-model responsive to first inputs, the second sub-model responsive to second inputs, the second inputs differing from the first inputs, wherein (2) the generator automatically produces sets of the first inputs and automatically varies the values of the first inputs in each of the sets of the first inputs, wherein (3) the generator automatically produces sets of the second inputs and automatically varies the values of the second inputs in each of the sets of the second inputs, and wherein (4) the generator automatically provides a set of the first inputs for each experiment using the first sub-model and automatically provides a set of the second inputs for each experiment using the second sub-model. Yet another aspect of the system further comprises (1) a second generator capable of running on the computer, the second generator automating the performance of a plurality of the experiments without changing the experiment and automatically varying the inputs for the experiments according to a sampling or search strategy different than that used by the generator; and (2) a second outcomeStore storing on the medium the outputs of the experiments automated by the second generator. Another aspect of the system is one wherein the display presents a plotted representation of two dimensions of a compound computational experiment for a first set of the outputs, the system further comprises a user interface capable of running on the computer, the user interface including a control manipulable by a user to associate a value with an unplotted dimension of the compound computational experiment, the display responsive to a manipulation of the control to (1) extract a second set of the outputs resulting from experiments that were run with a value for the unplotted dimension substantially equivalent to the value resulting from the manipulation, and to (2) present a plotted representation of the two dimensions of the compound computational experiment for the second set of the outputs. Also, another aspect of the system is one wherein the display presents a plotted representation of two dimensions of a compound computational experiment for a first set of the outputs, the system further comprises a user interface capable of running on the computer, the user interface including a control manipulable by a user to associate a value with an unplotted dimension of the compound computational experiment, the display responsive to a manipulation of the control to (1) cause the generator to perform a plurality of experiments to generate a second set of the outputs run using a value for the unplotted dimension substantially equivalent to the value resulting from the manipulation, and to (2) present a plotted representation of the two dimensions of the compound computational experiment for the second set of the outputs.

Another embodiment of the present invention is a method for performing compound computational experiments. The method comprises the steps of (1) encapsulating an experiment in an experiment object having a run method, the run method callable by other objects to run an experiment, the run method encapsulating outputs produced by an experiment in a result object; (2) encapsulating all input and output variables for an experiment in a domain object, the domain object having a read method callable by other objects to receive information about the input and output variables; and (3) encapsulating a search or sampling strategy in generator object, the generator object having a generate method callable by other objects to repetitively encapsulate a value for each input variable in a specification object and to repetitively call the run method to perform an experiment using each specification object, the generator calling the read method to acquire information about the input variables. A preferred aspect of the method comprises the further steps of (1) encapsulating experiment result data in an outcomeStore object, the outcomeStore object having an extract method callable by other objects to retrieve experiment result data; and (2) requesting a plot of experiment result data by issuing a plot command through a user interface running on a computer, the request invoking the generate method to produce experiment result data and invoking the extract method to acquire experiment result data for experiment dimensions related to the requested plot. Another aspect of method comprises the further steps of (1) plotting pixel data on a computer screen to visualize experiment result data corresponding to the experiment dimensions related to the requested plot; and (2) adjusting a control on the user interface to associate a value with an unplotted dimension of the experiment, the adjustment invoking the generate method to produce second experiment result data, invoking the extract method to acquire second experiment result data for experiment dimensions related to the requested plot, and plotting pixel data on the computer screen to visualize the second experiment result data corresponding to the experiment dimensions related to the requested plot.

Still another embodiment of the present invention is a system for performing compound computational experiments. The system comprises (1) experiment means for encapsulating and running a computational experiment; (2) domain means for encapsulating all inputs and outputs for an experiment; and (3) generator means for generating experiments by encapsulating subsets of the inputs encapsulated in the domain means and by combining the encapsulated subsets of inputs with the experiment means.

DETAILED DESCRIPTION OF THE PREFERRED EMBODIMENT

Figure 1:
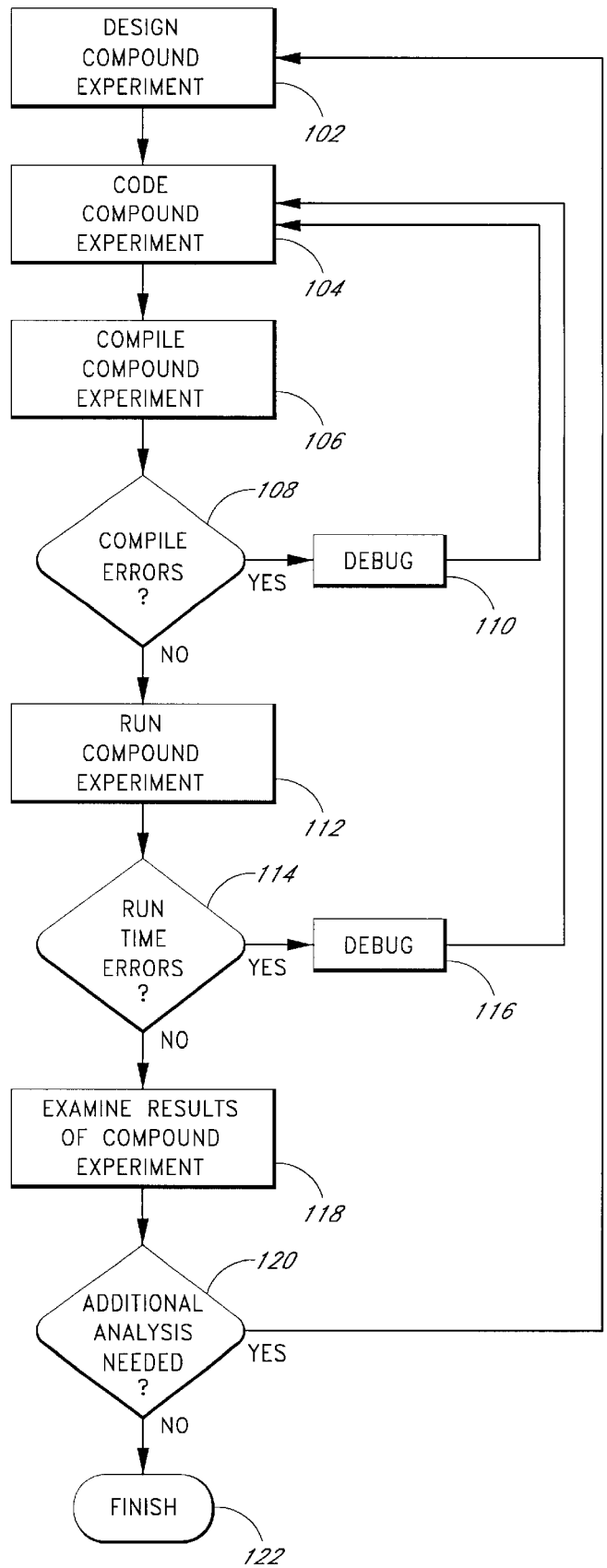
FIG. 1 illustrates a representation of steps in the prior art to construct and carry out a compound experiment using a computer.

FIG. 1 illustrates a representation of steps in the prior art to construct and carry out a compound experiment using a computer. In a first step 102, a user designs a compound experiment (CE). To design the CE, the user generally performs the following tasks:

identify and design an algorithm (frequently a model) which may provide useful information related to the problem identify the inputs to the algorithm (model)

identify the outputs to the algorithm (model)

determine the data structures needed to implement the algorithm and to store results determine the goals for the compound experiment (e.g., the properties of individual experiments that are being sought, which inputs to vary relative to other inputs, the extent of such variation, whether and which results should be reported during iterations)

identify how the outputs should be organized, printed and/or displayed

In a next step 104, the user codes the CE. In this step, the user selects a programming language (e.g., assembler, C, C++, Pascal, Visual Basic, etc.) and begins producing source code (i.e., entering programming language instructions). Besides being time-consuming, this process is highly susceptible to the introduction of errors, whether logical or typographical, as the user typically creates thousands of computer instructions organized into modules or callable subroutines for performing the following tasks:

declaring input and output variables declaring data structures, constants and temporary variables initializing variables providing control structures, typically in a main subroutine, that iteratively invoke the primary algorithm in pursuit of the goals of the compound experiment, and also providing appropriate exit conditions performing calculations in accordance with the selected algorithm a prompting for and accepting user input (e.g., graphical user interface)

writing result values to an output file or database reading, organizing and displaying result values trapping and handling error conditions Further, in a step 106, the user invokes a compiler to compile the coded CE. If, in a still further step 108, the compiler detects errors in the source code, then, in a step 110, the user engages in another time-consuming and tedious task, namely debugging the source code to locate errors. Once errors are located, processing reverts back to the step 104, wherein the user resolves errors or bugs by coding modifications to the source code. When, however, in the step 108, the compiler finally detects no errors, then, in a step 112, the user may run the CE.

If, in a next step 114, run-time errors occur (e.g., abnormal termination of the CE program), then in a still firther step 116, the user engages in the arduous task of debugging for logic errors. Those of ordinary skill in the art will appreciate that countless hours may easily be spent stepping one instruction at a time through a computer program executing in a debugging mode, setting watchpoints on particular variables to watch their values change loop after loop, before discovering the conditions causing each run-time error. Once these conditions are known, the user redesigns portions of the source code to resolve the run-time error. Processing then reverts back to the step 104 wherein the user codes the modifications necessary to fix the run-time errors. When, in the step 114, no further run-time errors are detected, then, in a step 118, the CE program executes the algorithm and formats and displays its results for the user to view.

In a further step 120, the user determines whether, in view of the results received, the analytical algorithm should be modified, whether the conditions controlling iteration of the algorithm or providing inputs to the algorithm should be modified, or whether the organization and display of data should be modified to better understand results. In any of those cases, processing generally resumes in the step 102 wherein the user designs a new CE having a different solution strategy (e.g., different algorithm, different iteration control, different inputs, different input ranges, different outputs, or different presentation of results). If the user determines no additional analysis is needed, then the process completes in a step 122.

It will be readily appreciated that the more complex the problem, the less likely it is that the user will, at the outset, understand the contributing factors, their relationship to the problem, or how to effectively model the problem. In such cases, using the prior art techniques, a user is faced with designing, coding, debugging and running dozens, if not hundreds, of CE's before arriving upon designs that yield useful information. Such an effort can very easily consume many man-months of time and labor. Consequently, the prior art virtually prohibits the use of compound experimentation in the very context where it is most useful—the exploration of complex problems. Furthermore, many complex problems such as weather systems or economic emergencies require meaningful analysis in hours or days, not months or years.

The present invention provides a problem exploration environment which allows a user to easily and expediently design, conduct, and observe the results of virtually any combination of compound experiments, conducted via a wide variety of types of individual experiment. The invention allows the user to easily construct the specification for a series of computer-generated experiments and then observe (typically through a graphical visualization) the pattern of outcomes that occur in the compound experiments, thus permitting more powerful exploitation of computers to support human reasoning.

The invention allows the user to specify compound computational experiments directly from graphic displays or from pull-down menus and to choose a wide variety of visual displays of multi-dimensional data resulting from these experiments. The present invention thus allows a user to focus attention on the arguments and reasoning to be supported by the compound experiments, rather than the tedious construction and reconstruction of numerous computer program modules, the painstaking clerical effort to manage the inputs and outputs of individual experiments, and frequent reprogramming likely to introduce new errors (bugs).

In one embodiment, the present invention comprises a flexible framework of software objects from which a wide variety of systems exploiting compound experiments may be readily constructed. A preferred embodiment of the invention in the software context is a general purpose environment called SPICE (Software Protocol for Instantiating Compound Experiments) that can be combined with any platform for conducting experiments to produce a system allowing users to easily analyze complex problems by constructing and performing compound experiments. SPICE can be regarded as an object oriented software framework that supports reasoning with compound experiments that can be run on a computer, simulated by a computer, controlled by a computer or interfaced to a computer and, hence, are computational.

Figure 2:
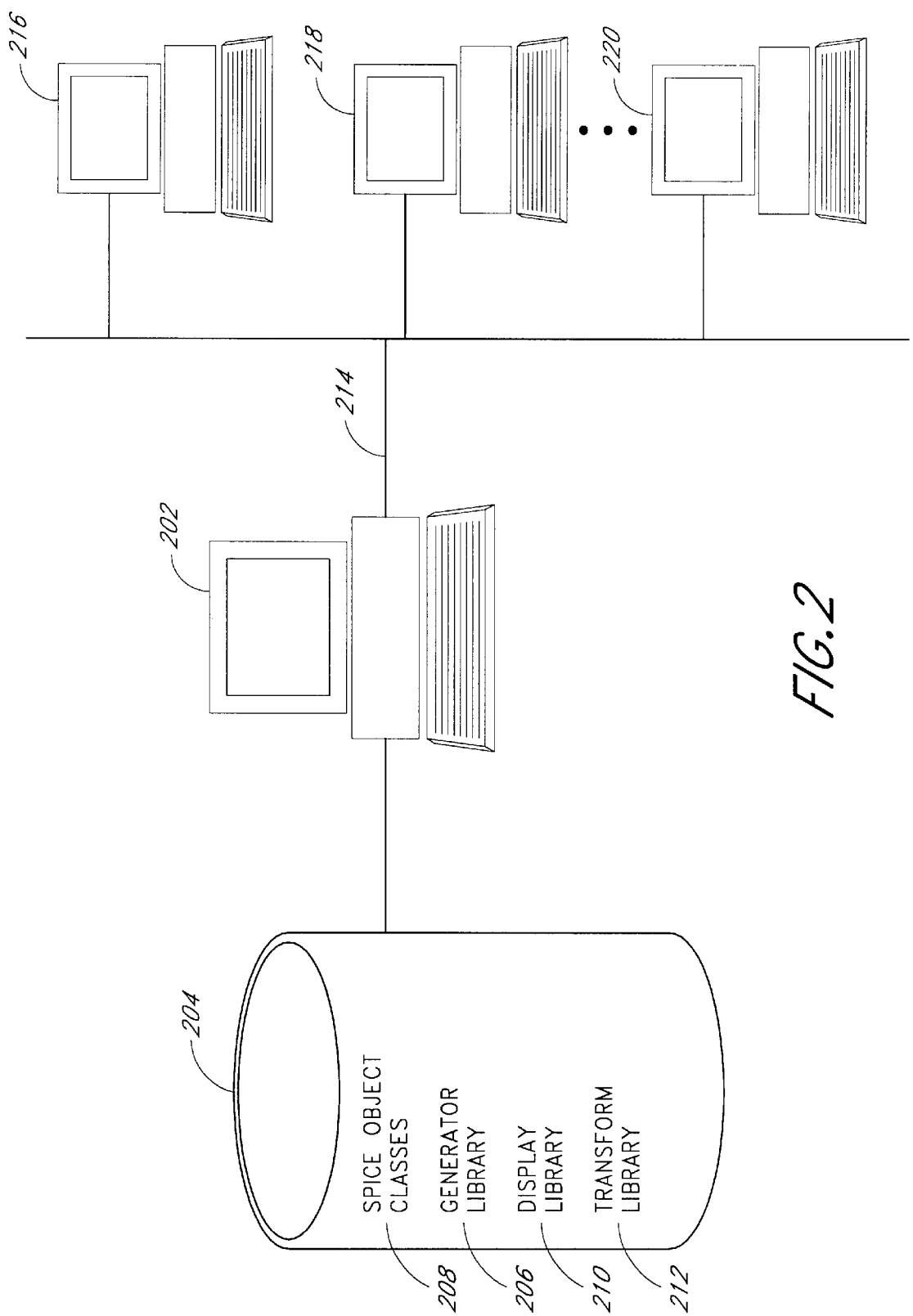
FIG. 2 illustrates a representation of a computer platform for SPICE.

FIG. 2 illustrates a representation of a computer platform for SPICE. A computer 202 is connected to a computer-readable storage device 204. The storage device 204 may be a hard disk drive connected directly to a controller in the computer 202, may be a RAM (random access memory) directly addressable by a processor in the computer 202, or may be one of a variety of other storage devices readable by a computer, including a CD-ROM or a storage device accessible over a network.

A user operating the computer 202 interacts with a graphical user interface of SPICE to select a domain of experimentation from a list of such domains. Each domain consists of a computer model or other subject for experimentation together with additional information that the user can provide (through a DCL file, see below). Upon selecting a domain, the user specifies a generator (e.g., by selecting one from a generator library 206). The generator accesses SPICE object classes 208 to instantiate input specification objects (each providing particular inputs to an experiment), output objects (each receiving output results from an experiment), and to cause arbitrary numbers of experiments to be executed as needed to explore a problem.

The user selects a display from a display library 210 to depict outputs returned by the experiments according to input dimensions selected by the user to define the display. A filter or collapser from the transform library 212 may be invoked to restrict or reformat collected output data to support the requested display. The display typically presents visual output to a monitor of the computer 202. The user may operate graphical controls, such as dials or slider bars, which also appear on the monitor and which control the processing of results to create a given display. For example, slider bars can control the value of inputs to experiments selected by the user but not directly represented on a display. By adjusting the graphical controls to vary the value of inputs, the plotted outputs (lines, color regions, scatter points, etc.) change in real time in accordance with the outputs returned from the completed experiments. Thus, SPICE allows a user to quickly and simply explore the manner in which each specified input dimension affects a problem as modeled by an experiment. As will be explained more fully below, the user may, very easily, after exploring results of one compound experiment, initiate additional compound experiments that use different input dimensions, test for different output conditions, or employ different iteration or search strategies and then again explore the results in real time using a chosen display—all with no additional programming.

The SPICE embodiment may exploit the presence of multiple computers 216, 218, 220 having available processing capacity connected by a network 214. In such an environment, SPICE can generate and dispatch experiments to any computers connected to the network 214. SPICE collects and pools the results for exploration. By exploiting available capacity on numerous computers, SPICE dramatically reduces the time consumed in running thousands of experiments to model particularly complex problems.

Figure 3:
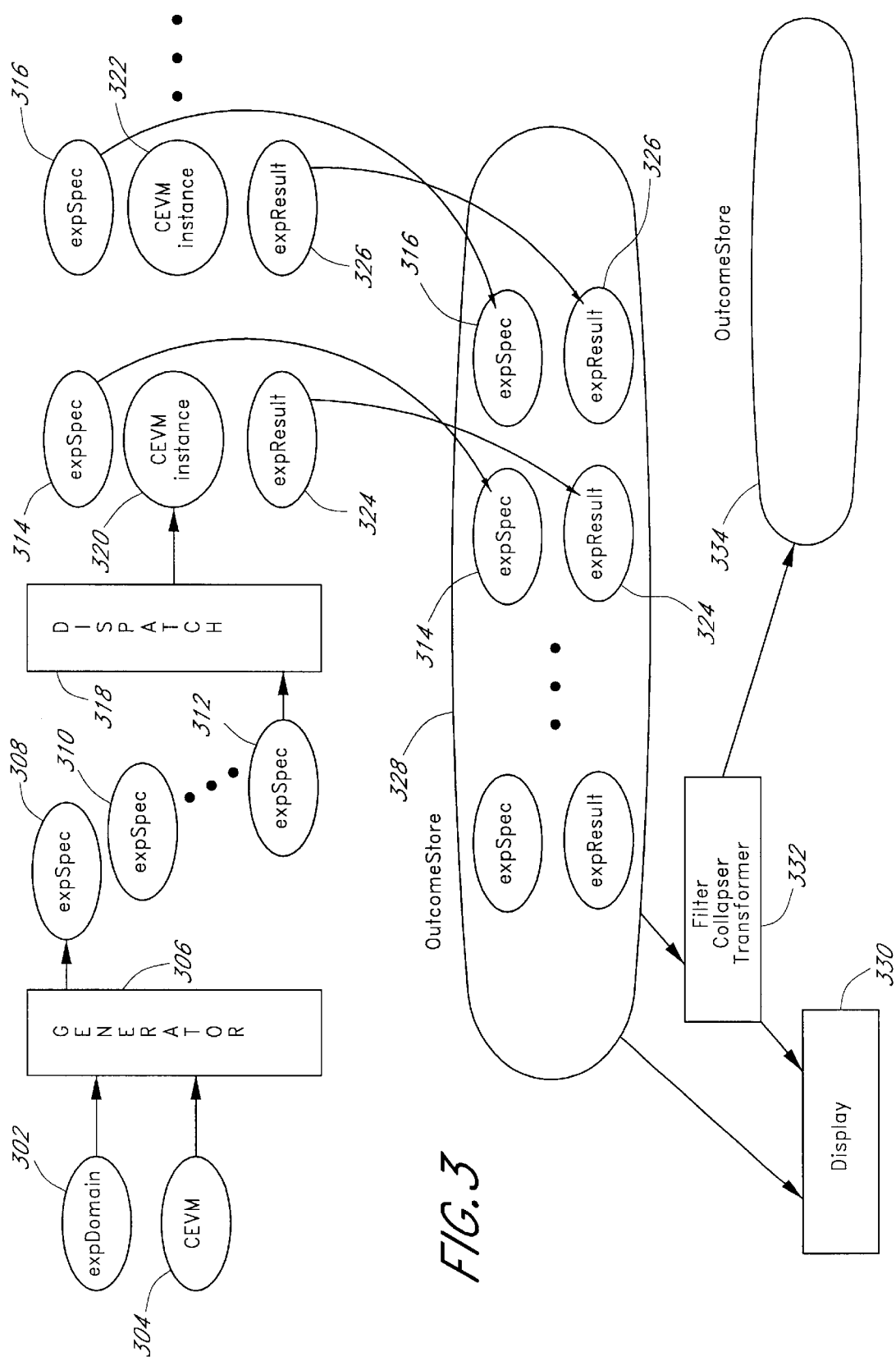
FIG. 3 illustrates a representation of the relationship between components of an embodiment of the present invention.

FIG. 3 illustrates a representation of the relationship between components of the SPICE embodiment. An expDomain 302 object includes information about all possible inputs (e.g., types and ranges) and outputs for a class of experiments and any other information the system possesses about the problem, such as constraints or probability distributions. A CEVM (compound experiment virtual machine) object 304 contains an experiment or model (e.g., algorithm, process, or one or more functions, transforms, or calculations) relevant to a problem to be explored. The CEVM object 304 includes a run method. The run method accepts a specification object identifying particular inputs for an instance of an experiment, invokes the experiment to run based on those inputs, and also produces a results object in which it places the results produced by the executed experiment.

A generator 306 may accept input from a user via a graphical user interface to specify inputs or set output conditions for a series of experiments. The generator 306 produces a stream of specification objects (expSpec objects 308, 310, 312, 314, 316), each of which specifies a particular set of inputs for an experiment. The generator 306 invokes the run method of the CEVM object once for each expSpec produced, thus specifying each expSpec as a parameter to an instance of a CEVM object 320, 322 corresponding to an individual experiment. As a second parameter to each CEVM instance 320, 322, the generator 306 provides a blank results object (expResult 324, 326) to receive the outputs produced by the experiment.

A dispatch object 318 schedules the execution of each individual experiment. The dispatch 318 determines whether additional computers are available on a network and, if so, schedules experiments to run on available computers until the entire series of experiments is complete or until the user terminates the series before completion. If only a single computer 202 (FIG. 2) is available, then the entire series of experiments is run on that computer.

As each experiment completes, the results are collected in an outcomeStore 328. For each completed experiment, the outcomeStore 328 maintains references to the expResult object 324, 326 having the output values of the experiment and to the expSpec 314, 316 having the inputs which caused the experiment to generate those outputs.

The user invokes a display 330 to visualize experiment results from the outcomeStore 328. A transform 332 may operate on the outcomeStore to reformat the input and output data in a manner to support the selected display 330 or to produce another outcomeStore 334 either formatted differently or including a subset of the original outcomeStore 328.

The SPICE object classes 208 (or base classes or abstract types) will now be described in detail.

Compound Experiment Virtual Machine (CEVM)

SPICE encapsulates the mechanism for performing individual experiments in an object which, in accordance with general object-oriented programming techniques, presents a standard interface to the rest of the system. This object is called a Compound Experiment Virtual Machine (CEVM).

Figure 4:
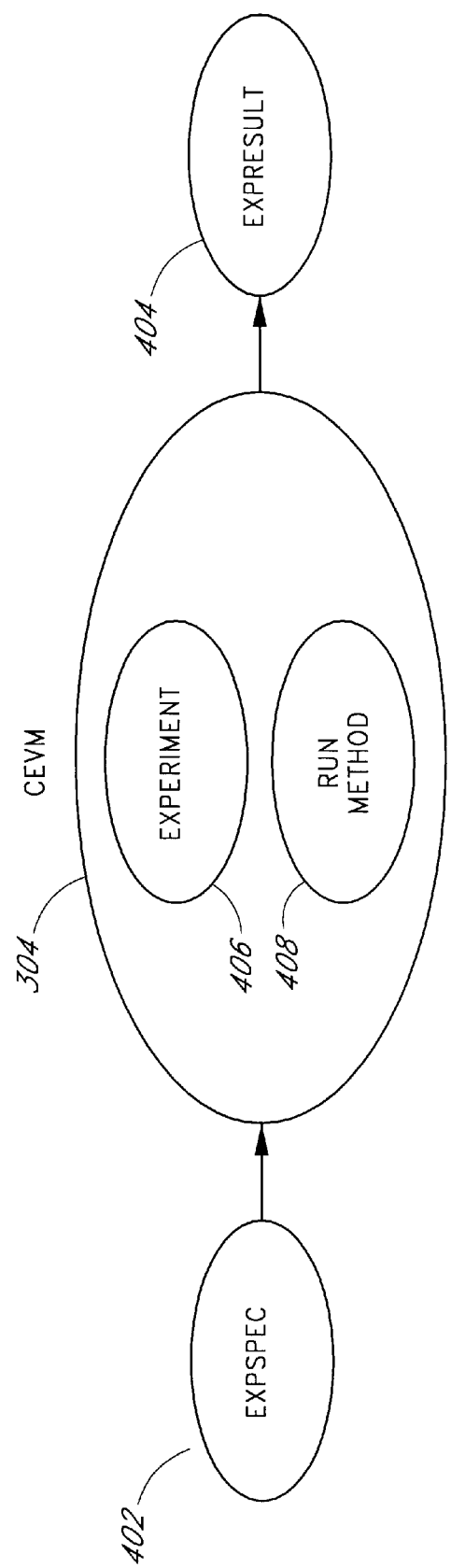
FIG. 4 illustrates a representation of a Compound Experiment Virtual Machine in accordance with an embodiment of the present invention, as well as its source of inputs and its repository for outputs.

FIG. 4 illustrates a representation of a CEVM 304, its source of inputs and its repository for outputs. The CEVM 304 accepts experimental specifications (an expSpec object 402) that specify the particular computational experiment to be run, and on completion of the experiment, returns an object that describes the outcome of the experiment (an expResult object 404). A CEVM 304 is, in effect, a virtual machine that implements a function from the universe of possible specifications to the universe of possible outputs.

In the SPICE embodiment, a CEVM 304 includes an experiment 406 or model (e.g., an algorithm, process, or one or more functions, transformations, or calculations) which responds to or acts upon one or more inputs and produces one or more outputs. The CEVM 304 also includes a run method 408 which is exposed to other a components of SPICE. Thus, through a standardized interface, other components invoke the run method to cause the experiment or model to be executed upon specified inputs and to return the produced outputs for analysis.

Systems implemented in SPICE can perform explorations on arbitrary foreign software objects by encapsulating the objects in CEVM's. The encapsulating CEVM unpacks the information in an expSpec, transforms that information into whatever form the interface of the foreign software expects, and, on return, packs the results of the experiment into an expResult object. Similarly, a base CEVM class 304 can be used to implement subclasses that inherit the general properties of the base CEVM, but are specialized to interface with objects of a particular type. Thus, a subclass CEVM may include specialized interface mechanisms to interact with other software. For example, a subclass CEVM may include specialized interface features to invoke Microsoft Excel (a popular spreadsheet program), including a spreadsheet launch method to invoke Excel, a conversion method to convert inputs from an expSpec object to a format appropriate for spreadsheet cells, a load method to load one or more spreadsheet cells, a spreadsheetCalculate method to cause Excel to run calculations based on new cell data, and an unload method to retrieve data from spreadsheet cells. In such manner, a base CEVM class 304 can form the foundation for subclasses that interface with a wide variety of software programs such as, for example, Microsoft Excel, Mathematica, or PowerSim. As will be appreciated by those of ordinary skill, many techniques exist for launching external programs from another program and for passing messages or data back and forth between programs.

In addition, a CEVM class may include interface mechanisms to interface to devices for performing mechanical experimentation, such as certain numerical control machines which receive input instructions and return values related to temperatures, run rates, or errors. Other devices include printers, telephone switches, network routers, appliances, automobile engines, devices having embedded real-time systems, or any device which can receive inputs from a computer interface and return outputs in a computer readable form. Those of ordinary skill in the art will appreciate that it is routine for software to transmit instructions through a communication interface to external machinery and to retrieve signals generated by machinery in a manner that the software may test the signal and take differing actions based on the signal value.

Another set of contemplated interfaces for CEVM subclasses relates to the Internet. In one embodiment, a CEVM subclass generates Web searches based on instructions from an expSpec, returned information is an expResult, and a search process is guided by a generator.

By encapsulating experiments with objects with a standard interface and thus eliminating the need for other components of SPICE to use experiment-specific constructs (e.g., data structures), SPICE maximizes the ease with which any type of experiment can be interfaced and automatically compounded.

Specification for an Experiment (exvSpec)

ExpSpec objects 402 encapsulate data representing the information necessary to set up a particular computational experiment. It is natural to think of this data structure as containing the "inputs" for the experiment, although in this computational paradigm, specifications are not exactly like the inputs to programs in the sense commonly understood. The information in an expSpec object 402 consists of a fixed length list of objects of type Entry described below. The expSpec class has methods that allow reading and writing its various entries, as well as other support methods for efficient copying and testing of its contents. In one embodiment, these methods include:

| | |
|---|---|
| getxxxSpec (n) | returns value of nth entry of type xxx (e.g., getIntSpec(5) returns the integer value of the 5$^{th}$ entry of the expSpec object) |
| setxxxSpec (n, i) | writes value of i of type xxx as value of nth entry (e.g., setFloatSpec(4, 3.1415926) sets the value of the 4$^{th}$ entry of the expSpec object to 3.1415926. |
| copySpec | returns a copy of the expSpec object |
| equalSpec(n, i) | returns TRUE if the value of the nth entry equals i, otherwise returns FALSE |
| lessthanSpec(n, i) | returns TRUE if the value of the nth entry is less than i, otherwise returns FALSE |
| greaterthanSpec(n, i) | returns TRUE if the value of the nth entry is greater than i, otherwise returns FALSE |

Results from an Experiment (expResult)

ExpResult objects 404 encapsulate a data structure that contains information resulting from a particular experiment. Thus, an expResult object 404 can be thought of as containing the "outputs" from an experiment. The information in an expResult object 404 consists of a fixed length list of objects of type Entry, although the subtypes of Entry that will be used will more restricted than those for an expSpec object 402 (this is the only syntactic difference between these two classes). The expResult class has methods that allow reading and writing its various entries, as well as other support methods for efficient copying and testing of its contents. In one embodiment, the methods include:

| | |
|---|---|
| getxxxResult (n) | returns value of nth entry of type xxx (e.g., getIntResult(5) returns integer value of 5$^{th}$ entry) |
| setxxxResult (n, i) | writes value of i of type xxx as value of nth entry (e.g., setFloatResult(4, 3.1415926) sets the value of the 4$^{th}$ entry of the expResult object to 3.1415926. |
| copyResult | returns a copy of the expResult object |
| equalResult(n, i) | returns TRUE if the value of the nth entry of the expResult object equals i, otherwise returns FALSE |
| lessthanResult(n, i) | returns TRUE if the value of the nth entry is less than i, otherwise returns FALSE |
| greaterthanResult(n, i) | returns TRUE if the value of the nth entry is greater than i, otherwise returns FALSE |

Entry in an expSpec or expResult (Entry)

In the SPICE embodiment, an Entry object holds a value of a particular type, and is a component of either an expSpec object 402 or an expResult object 404. Entry objects hold values of four basic types:

Int: an integer value

Float: a floating point value

Double: a double precision floating point value

Enum: an enumerated value (stored as an integer, but means one of a finite set such as {apple, orange, persimmon})

In addition, Entry objects may hold one of two recursively defined types:

array of Entry expSpec (this option not used in expResult objects)

Array is a linear list of entries of fixed dimension. By having an array of arrays, multidimensional arrays are possible in the fashion of the programming language C.

Entries of class expSpec (not necessarily, an expSpec of the same dimensionality or structure as that of the expSpec that contains an expSpec entry) result in expSpec objects that have the syntactic structure of a tree. Such structures represent more complex spaces of alternative experiments than would be possible with fixed length lists of basic type Entry objects only. The SPICE embodiment advantageously provides the capability to explore over structural variation in computer models or experiments in addition to variation in input parameters.

Many important problems involve uncertainty in the structure of an experiment. For example, unit sales of a product might be a function of that product's price and the amount spent on advertising the product. But one might not know what function most accurately predicts the unit sales. The actual dependence might be linear, logistic, exponential, or only approximately captured by any of these. An ideal marketing strategy would involve a combination of pricing and advertising that performs well across the widest range of plausible relationships. To assist in crafting such a marketing strategy, the SPICE embodiment facilitates exploration across various marketing strategies over the full range of plausible functional relationships between price and advertising.

In a complex computer model, the number of such structural uncertainties can be very large, and may be nested. Thus, for example, a model of a national economy might have as a component a sub-model calculating a rate of inflation. The range of models of the national economy one might like to explore would then include all possible sub-models for the rate of inflation. Each of these might include some number of uncertain functional relationships (or sub-sub-models), each with differing numbers of inputs having various ranges.

The SPICE embodiment represents such complex spaces of models through the use of:

Entry objects of enumerated type that specify which from a list of alternative sub-models is to be used for a particular experiment Entry objects that provide specifications (i.e., an expSpec object) for a chosen sub-model Thus, for example, suppose there is a computational experiment which has one sub-model, for which there are three alternative versions. Each alternative requires a different set of input parameters. Thus, a specification for that computational experiment must both indicate which of the three sub-models is to be used, and provide an appropriate specification for that sub-model. This can be represented by having two Entry objects in the specification (expSpec object) for a given experiment.

The first Entry object would specify a selection from an enumerated type with three values, one for each of the alternative sub-models. The second Entry would be the specification (expSpec object) for the selected sub-model. The specification of a sub-model can also have Entry objects that are specifications (expSpec objects), and this recursive nesting can be used to arbitrary depth. SPICE thus advantageously provides specification structures having the form of trees which support exploration over variation in model structure.

A generator in the SPICE embodiment for creating such tree structured specifications operates as a generative grammar. The rules of the grammar are contained in the information stored in a domain object that specifies the alternative sub-models and the specification type (expSpec object version) to be used with each sub-model. The generator proceeds top-down, first picking sub-models, then filling out their specifications, including any needed selections of sub-sub-models. Similarly, a CEVM class for constructing a particular model instance from such a tree structured specification can operate as a generative grammar, using a combination of macro expansion, conditional compilation, and parameter substitution to fill in a model framework with piece parts whose selection is indicated by the specification (expSpec object).

The following simplistic example illustrates how SPICE facilitates exploration over variation in a model. In the example, the outcome of a class of computational experiments is a real valued number, C. The value of C is calculated as a function of variables A and B (i.e., C=f(A,B)) where the exact functional dependence is uncertain. For purposes of exploration, one might wish to consider for f any polynomial function of A and B. If A and B are inputs, then an expSpec object for this example includes four items:

1) value for A
2) value for B
3) value for N-degree of f
4) specification for the parameters of f Thus, for an experiment with

A=2.

B=3.5 f=1.2*A$^2$+3.4*B$^2$-(2.5*A*B)+6 the expSpec object would be

| 2. | 3.5 | 2 | . |

| 1.2 | 3.4 | -2.5 | 0. | 0. | 6. |

Note that the length of the second level expSpec (4th Entry of first level expSpec) varies depending on the value for N, which is the third Entry.

A general purpose CEVM for instantiating specifications such as this uses macro expansion. This example involves a single macro expression in the code (i.e., computer programming language instructions) for the model at the proper location for C to be calculated.

In one embodiment, the macro expression is "C=#f(A,B) #", where "#" characters delimit an expression to be expanded in the CEVM before the model is run. Here, the characters "A" and "B" are recognized as corresponding (based on information contained in the declaration (DCL) file and expDomain object) to the first and second Entry objects of the expSpec object respectively. Similarly, the symbol "f" is recognized as corresponding to the third and fourth entries. As a consequence of the third entry in the example specification above being 2 (indicating a second order polynomial) the CEVM expands the above macro expression to become:

$$C=\#C_{220}*A**2+C_{202}*B**2+C_{211}*A*B+C_{110}*A+C_{101}*B+C_{000}\#$$

Note that this example uses * to mean multiplication and ** to mean exponentiation. Moreover, it is well known that, in second order polynomials, there are three second order terms (A$^2$, B$^2$, A*B), two first order terms (A, B) and one zero order term (constant). Hence, an automatable technique for expanding terms in a second order polynomial function may be based on 3-digit codes, the first digit corresponding to the order of the term, the next two digits may range from zero to the value of the order of the term but must add up to the value of the term. The 3-digit codes for the six terms of a second order polynomial can be 220, 202, 211, 110, 101, and 000 (which correspond to the six places in the second level expSpec object. This scheme expands to cover polynomials of different orders.

Next the CEVM substitutes the actual values of A and B for those symbols yielding:

$$C = \#C_{220}*2.**2+C_{202}*3.5**2+C_{211}*2.*3.5+C_{110}*2.+C_{101}*3.5+C_{000}\#$$

The CEVM then replaces the symbols $C_{220}$, $C_{202}$, $C_{211}$, $C_{110}$, $C_{101}$, $C_{000}$ with their values as specified in the expSpec in the 4th Entry. This results in the fully expanded line (which, in one embodiment, is a syntactically correct statement in the FORTRAN computer programming language):

$$C=1.2*2.**2+3.4*3.5**2+(-2.5)*2.*3.5+0.*2.+0.*3.5+6.$$

With all substitutions completed, the resulting model is compiled and executed, and the resulting value for C placed in an expResult object.

The capability for exploring across structural variation in experiments provides an important advantage. At present, users cannot, without extensive reprogramming, test whether conclusions that emerge from computational experiments are sensitive to the details of the model used. The SPICE embodiment allows computerized reasoning systems to test for such sensitivity, catching errors in judgment that might otherwise be made, and allowing more aggressive reasoning from computational experiments.

Figure 5:
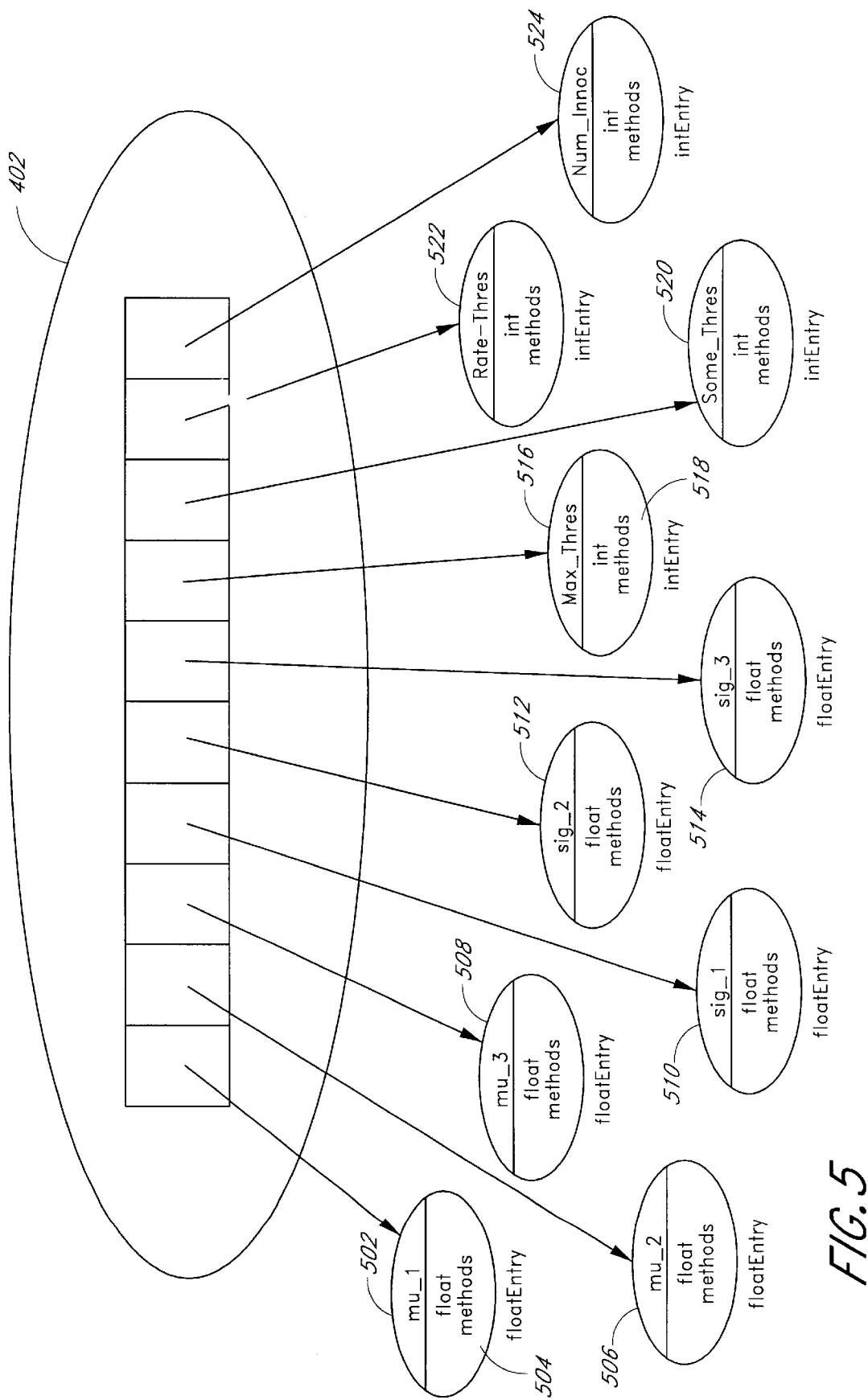
FIG. 5 illustrates a representation of an expSpec object in accordance with an embodiment of the present invention.

The subclasses of Entry each implement type-dependent methods for:

setting their value returning their value returning a string representation of their value reading/writing their values from/to an input/output stream FIG. 5 illustrates a representation of an expSpec object 402 having ten (10) entries, six (6) of type float (floating point) and four (4) of type int (integer). A first entry 502 is of subclass floatEntry, having a name, mu__1, associated with a floating point type variable, as well as associated type-dependent methods 504. Second, third, fourth, fifth and sixth entries 506, 508, 510, 512, 514 are similar to the first entry except they have different names. A seventh entry 516 is of subclass intEntry, having a name, Max__Thres, associated with an integer type variable, as well as associated type-dependent methods 518. Eighth, ninth and tenth entries 520, 522, 524 are also of subclass intEntry, similar to the seventh entry, but having respective names Some__Thres, Rate__Thres, and Num__Innoc.

Figure 6:
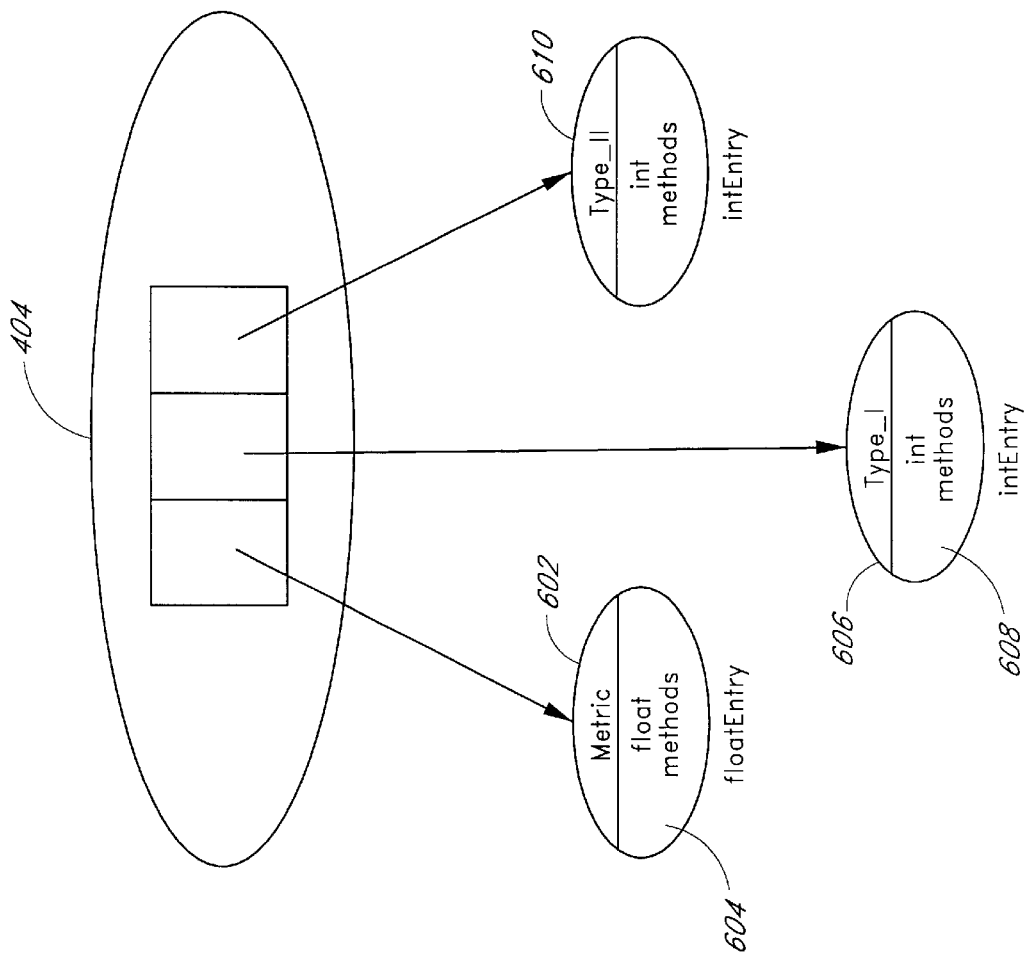
FIG. 6 illustrates a representation of an expResult object in accordance with an embodiment of the present invention.

FIG. 6 illustrates a representation of an expResult object 404 having three (3) entries, one (1) of type float and two (2) of type int. A first entry 602 is of subclass floatEntry, having a name, Metric, associated with a floating point type variable, as well as associated type-dependent methods 604. A second entry 606 is of subclass intEntry, having a name, Type__I, associated with an integer type variable, as well as associated type-dependent methods 608. A third entry 610 is similar to the second entry 606 except that it has a different name, Type__II.

Database of Results of Executed Computational Experiments (outcomeStore)

An outcomeStore object contains a collection of expSpec object 402, expResult object 404 pairs, each pair corresponding to an executed computational experiment. The outcomeStore class includes methods to:

store a new expSpec object 402, expResult object 404 pair return the expSpec object 402, expResult object 404 pair corresponding to a particular expSpec object or a special value: <case not found>.

return a new outcomeStore containing a subset of pairs (possibly the null set), where the pairs included in the subset satisfy some property. A general purpose method allows the desired property to be any Boolean function of an input/output pair (expSpec/expResult).

For example, an experimental domain includes an expSpec object having two real number Entry objects labelled A and B and an expResult object having a single real number Entry object labelled C. If the notation <2.,1.>, <1.> represents an expSpec/expResult object pair where A=2., B=1., and C=1., an outcomeStore with four records may be expressed as:

<2.,1.>, <1.>

<0.,0.>, <4.>

<5.,0.>, <2.>

<0.,5.>, <2.>

Using a boolean function which returns TRUE only if A=0., a filter applying that boolean method to the above outcomeStore would return a new outcomeStore containing the two records:

<0.,0.>, <4.>

<0.,5.>, <2.>

Using a filter employing a boolean function which returns TRUE only if A=3. * C, the result would be an empty outcomeStore.

for outcomeStore classes implemented on a relational database system, return a new outcomeStore containing a subset of expSpec object 402, expResult object 404 pairs, where the pairs in the subset have properties satisfying conditions that can be described by SQL expressions.

read or write the contents of a result store from/to I/O streams iterate through its stored (expSpec, expResult) pairs, returning one at a time until all are returned In the SPICE embodiment, the outcomeStore class stores the expSpec object 402, expResult object 404 pairs in a data structure in RAM. An outcomeStore includes two arrays, the first an array of pointers to expSpec objects, and the second an array of pointers to expResult objects. However, this abstract type could be used to encapsulate any database system or mechanism, allowing systems built in SPICE to be readily migrated to utilize arbitrary relational databases or other storage mechanisms. It will be readily appreciated by those of ordinary skill that the methods described above may be easily modified to perform storage, search and retrieval functions using different storage media, whether RAM data structures, random access files on a hard disk, CD-ROM (read/write capable), or a relational database system.

Domain of Computational Experimentation (expDomain)

In the SPICE embodiment, an object of class expDomain contains information related to a problem, including the set of computational experiments that might be conducted to assist in reasoning about it. Thus, an expDomain object includes:

information about the origin and version of the expDomain object. This information includes version history, annotations related to modifications in progressive versions and synthetic expDomain object creation (explained in more detail below) indicators such as time/date stamp and automatically generated comments identifying how this synthetic domain was created (i.e., swap of variables).

information about other objects the expDomain object is related to, including identification of an associated CEVM object.

information about the properties of the input and output spaces of the associated computational experiment, in particular the syntactic properties of the expSpec and expResult objects for this CEVM, and any known constraints on the range of experiments. Constraints involving single Entry objects (for example, the maximum or minimum value for the Entry) are associated with the expDimension object associated with that Entry. Constraints involving multiple Entry objects can be represented with boolean functions. Constraints depending only on expSpec Entry objects (e.g., input 1+input 2 >input 3) are evaluated prior to an experiment being run, and thus, can prevent experiments which violate the constraint from being run. Constraints involving expResult Entry objects can only be evaluated after an experiment has run, excluding from an outcomeStore or a plot any experiments that violate such constraints.

The property information includes two lists of expDimension objects, the first list in one-to-one correspondence with the list of Entry objects in the expSpec object for this expDomain class, and the second list in one-to-one correspondence with the list of Entry objects in the expResult object for this expDomain class.

The expDomain class supports methods that:

create a particular expDomain object from information in a domain declaration (DCL) file (described in detail below)

allow modification of expDomain properties. In the SPICE embodiment, these methods are called by user interface routines allowing users to interactively create or modify expDomain objects. For example, users can choose a menu option "Modify Domain," select an existing expDomain object from a list, and, when presented with a list of inputs and ranges of values for each input, can modify any of the ranges, can delete any of the inputs, or can add new inputs and specify the input type (int, float, etc.) and ranges of values for the new inputs.

return expDomain object info:
  number of entries in expSpec or expResult
  maximum, minimum, nominal or random number for any expDimension object. These methods are type-dependent. The random number method, randomValue, returns a random number within the range specified for the expDimension object.
  ref or pointer to expDimension object containing info about any given input or output dimension construct and return empty or default expSpec or expResult objects for this expDomain object (so called "factory" methods for these objects)

These methods assist various general object classes of SPICE in performing domain dependent actions. For example, generic versions of generators customize their behavior for particular domains through queries to the expDomain object. This can be seen in the example where a Monte Carlo sampling generator queries the expDomain object for the number of entries in the expSpec object and also queries the expDomain object for random numbers for those entries.

The properties of any particular expDomain object can be set in the domain object interactively through method invocation by a graphical user interface or by reading in a text file that describes these properties. In particular, the structure of the expSpec and expResult objects that define the interface of the CEVM are defined in this declaration file.

expDimension

An expDimension object encapsulates all the information that is known about a dimension of the experimental domain. This abstract type has subclasses in parallel to the subclass hierarchy of Entry (see above). Thus, there are subclasses. based on the type of dimension (int, float, array, etc.). These classes differ in that Entries hold the value of an input or output for a particular computational experiment, while expDimension objects contain information about an input or output dimension for all possible computational experiments in a given domain. Information that might be stored in an expDimension object includes:

constraints on the range of values for this dimension. Such constraints include high (maximum) and low (minimum) values for numerical dimensions.

nominal or default values (input dims only)

a color map for color coded graphical display. For example, threshold =[10,20,30] would result, for some graphical types, in four color regions, one for values less than 10, a second for values between 10 and 20, a third color for values between 20 and 30, and a fourth color for values over 30.

definition of a probability distribution (or other weighting function) for this dimension (type and parameters). The user may declare in a DCL file, for example, "probability=uniform" for a uniform probability distribution, or "probability=normal (0, 1)" for a normal distribution with a mean of zero and a variance of 1.

Figure 7:
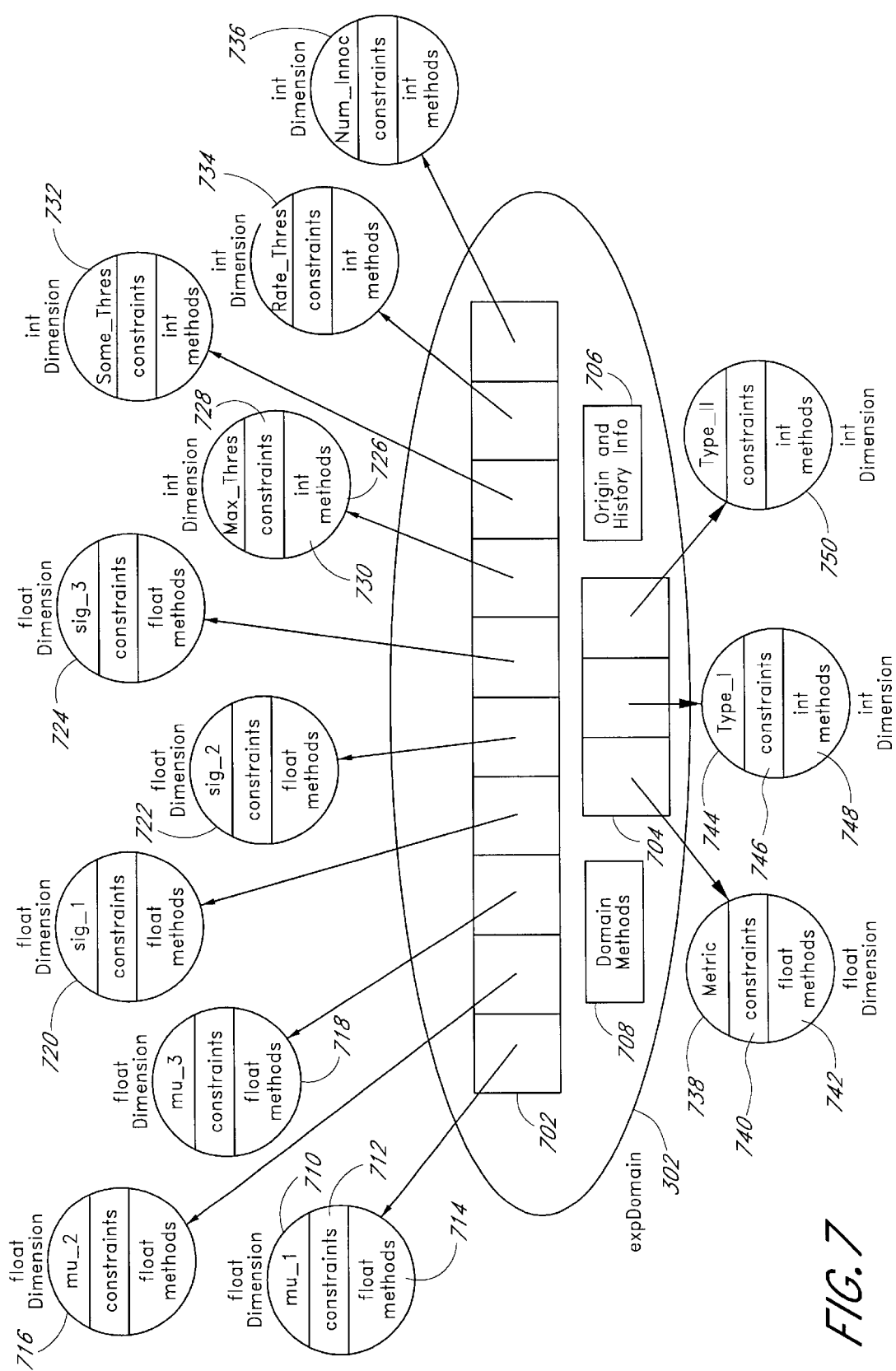
FIG. 7 illustrates a representation of an expDomain object in accordance with an embodiment of the present invention.

FIG. 7 illustrates a representation of an expDomain object 302 having a first list 702 of expDimension objects and a second list 704 of expDimension objects. The expDomain object 302 includes origin and history information 706 and domain methods 708 for creating an expDomain object, modifying properties of an expDomain object, returning information about expDomain and expDimension objects, and for creating blank or default expSpec or expResult objects. The first list 702 of expDimension objects includes ten (10) expDimension objects, the first of these 710 being of subclass floatdimension, has a name, mu_1, associated with a floating point type variable, has associated constraints 712 on the floating point values that the variable may take, and has associated type-dependent methods 714. The list 702 includes five (5) additional expDimension objects of subclass floatDimension 716, 718, 720, 722, 724, each similar to the first 710, except that each has a different associated name with possibly differing constraints on the value that the respective associated floating point value may take.

This list 702 includes a seventh expDimension object 726, it being of subclass intDimension, having a name, Max_Thres, associated with an integer type variable, having also associated constraints 728 on the value that the integer variable may take, and also having associated type-dependent methods 730. The first list 702 includes three (3) additional expDimension objects of subclass intDimension 732, 734, 736, each like the seventh expDimension object of subclass intDimension, except that each has a different name, and possibly differing constraints on the value that the respective integer variable may take.

The second list 704 includes a first expDimension object 738 of subclass floatDimension, having a name, Metric, associated with a floating point type variable, and has associated constraints 740 indicating, for example, colors to be used in plotting values within particular ranges, and also has associated type-dependent methods 742. The second list 704 also has a second expDimension object 744, it being of subclass intDimension, having a name, Type_I, associated with an integer type variable, and having constraints 746 and also having associated type-dependent methods 748. The third expDimension object 750 is similar to the second expDimension object 744 of the second list 704, except that it has a different name and possibly differing constraints.

Generators

In accordance with one embodiment of the present invention, a generator causes a series of a selected experiment to be performed with possible guidance from the user. The generator specifies the inputs to be used by each individual experiment, and may select the inputs in accordance with a predetermined strategy for selecting input combinations.

In performing compound experimentation, some input selection strategies or search strategies prove quite effective in causing a series of experiments to quickly yield results useful in understanding, addressing or reasoning about a problem. Other input selection strategies may provide useful feedback albeit less efficiently or may simply fail to yield any useful information about a problem. The differences in the effectiveness of particular input selection strategies are often perceived most acutely when applied to complex experiments involving many, perhaps dozens or even more, input variables.

It is also often the case that the optimal input selection strategy or search strategy is not known prior to running a compound experiment. This is particularly true for experiments modeling complex problems. The present invention exploits standardized interfaces between encapsulated search strategies, encapsulated input specifications and encapsulated experiments to advantageously provide a system wherein an experiment may be combined with any search strategy without any need to modify the experiment. Thus, a user can simply choose a search strategy and run a compound experiment and determine the effectiveness of the search strategy by exploring the resulting outputs. If one search strategy proves ineffective, another can be selected and tested with very little effort.

In the SPICE embodiment, a generator object encapsulates a search strategy. Thus a different generator exists for each search strategy. Each generator includes a method for running a compound experiment. The generator generally determines the particular value that will be used for each input for each experiment in the series.

For example, a generator may be given an input specification indicating that three inputs, x, y, and z are to be used in an experiment and that x may range from 1 to 10, y from 1 to 100, and z from 1 to 1000 (all in steps of 1.0). Using a full factorial or combinatorial sampling search strategy, this generator causes one experiment to be run for every possible combination of x, y and z, and thus would cause 10*100*1000 experiments to be run. It will be appreciated, however, that such a search strategy may not be practical in all cases (e.g., an experiment using 50 variables, each having one million possible values).

Another possible generator performs random number or Monte Carlo sampling. In that sampling strategy, the generator causes a series of experiments to be run wherein a random number is generated for each input (each random number being within the range of possible values for the particular variable). Besides factorial sampling and Monte Carlo sampling, other well known search or sampling strategies include Latin Hypercube sampling and various hill climbing strategies such as stochastic hill climbing or gradient descent. The number of possible search strategies is infinite, as is the number of possible generators implementing search strategies. Advantageously, the present invention includes a framework for expressing a search strategy and for making each expressed search strategy available for use with any experiment.

In the SPICE embodiment, a generator is an instance of the abstract type or class of generators. Generators in the SPICE embodiment are coded as objects using the C++ programming language. Usually, a generator includes the following methods: initialize, nextSpec, and runCompoundExperiment. The runCompoundExperiment method is exposed to other components of SPICE and presents a standardized interface to Generator objects. The structure of a generator in the SPICE embodiment will be described with respect to example search strategies.

To run a compound experiment wherein the experiment uses three integer variables, x, y and z, where x may range from 1 to 10, y from 1 to 100, and z from 1 to 1000, a generator class for performing a factorial sampling search strategy preferably includes a runCompoundExperiment method.

The runCompoundExperiment method calls an initialize method of the generator to set counter and threshold variables associated with each input. The initialize method builds a linked list of input structures. Each input structure includes a Val variable, a Level variable, a Step variable and pointer to the next structure. The initialize method determines the number of inputs (e.g., 3) and, for each input, allocates an input structure in memory, sets the Val variable to the lowest value in that input's range (e.g., Val corresponding to x is set to 1), sets the Level variable to the highest value in that input's range (e.g., the Level variable corresponding to input x is set to 10), sets the Step variable to the size of the increment to use in adjusting the value of the input (e.g., the Step variable for the x input is set to one (1) so that x will be incremented by one throughout its range), and sets the Pointer to NULL or to point to the next structure if there is another input. The initialize method sets an inputRoot pointer to point to the first input structure in the linked list.

The runCompoundExperiment method includes a loop structure wherein instructions within the loop are executed until the loop terminates. Within such a loop structure, the runCompoundExperiment method calls a nextSpec method. The nextSpec method constructs an expSpec object by requesting a blank expSpec object (by invoking the emptyExpSpec method of the expDomain object). The nextSpec method sets the value of each input in the new expSpec object by traversing the linked list of input structures and using the value of the Val variable of each structure to set the value of each corresponding input in the expSpec object. The nextSpec method traverses the linked list by using the inputRoot pointer to access the first structure and the Pointer variable of each structure to access the next structure in the list. The nextSpec method completes when it encounters a Pointer variable equal to NULL.

Then, still within the loop structure, the runCompoundExperiment method calls a runRequest method of a dispatch object, providing the new expSpec object as an input to the runRequest method. The runRequest method, in turn, calls the run method of the CEVM class encapsulating the experiment to be run. The appropriate CEVM is identified by providing, as a parameter to the runRequest method, a pointer to the CEVM. The experiment then executes and produces outputs which are packed into an expResult object.

Also within the loop structure, a subroutine called advanceInputs is called which traverses the linked list of input structures and increments (by the Step amount) the Val variable of the first structure located wherein the Val variable is less than the Level variable. It will be appreciated that this incrementing could be performed in the nextSpec method. If the advanceInputs subroutine increments a Val variable, it returns TRUE. If, however, no Val variables are less than their corresponding Level variables, then all combinations of input values have been supplied to experiments and the advanceinputs subroutine returns FALSE. The loop condition terminates when advanceinputs returns FALSE.

In pseudocode form, the following exemplifies instructions in a runCompoundExperiment method implementing a factorial sampling search strategy.

```
initialize();
loop
{
    newExpSpec = nextSpec( inputRoot );
    runRequest( newExpSpec );
    continue = advanceInputs( inputRoot );
} until (NOT continue)
```

To retrieve the results of each experiment, the runCompoundExperiment method calls a resultRequest method of the dispatch object. The runCompoundExperiment method calls the resultrequest method once for each experiment run. The resultRequest method returns the expSpec object that provided the inputs for the experiment and the expResult object which holds the outputs produced by the experiment. To store this information, the runCompoundExperiment method calls the Store method of the outcomeStore class, providing to the Store method both the expSpec and the expResult objects. The Store method stores the paired expSpec and expResult objects in the outcomeStore for later analysis. The appropriate outcomeStore object is identified by a pointer to the outcomeStore object, passed as a parameter to the runCompoundExperiment.

A random number or Monte Carlo search strategy may be implemented in a generator that performs a series of experiments using the same three inputs discussed in the above example, namely x (ranging from 1 to 10), y (ranging from 1 to 100) and z (ranging from 1 to 1000). A generator for a Monte Carlo sampling strategy includes an initialize method which determines the number of experiments to be run. In one embodiment, the Monte Carlo generator prompts the user by means of a dialog box appearing on the user's computer screen requesting that the user enter the number of experiments to run. In another embodiment, the Monte Carlo generator continues to generate experiments until terminated by the user.

The Monte Carlo generator includes a loop structure in the runCompoundExperiment method controlled by the number of experiments to run. In the loop, the runCompoundExperiment calls the nextSpec method. The nextSpec method requests an empty expSpec object and sets each input in that expSpec by assigning to each input a random number within the input's range. In one embodiment, the nextSpec method calls the randomValue method of the domain object specifying a numeric parameter, n, corresponding to the nth input in the domain. The randomValue method returns a random number within the range of the corresponding input and of a type corresponding to the type of the input (i.e., int, float, double, etc.). The nextSpec method returns the new expSpec object having inputs assigned to random values (e.g., x=7, y=68, z =313).

Using each new expSpec object returned by the nextSpec method, the runCompoundExperiment method causes experiments to be run by calling the runRequest method as described above and retrieves and stores results as described above.

To illustrate the flexibility of the generator framework, another search strategy—a genetic sampling search strategy—will be described. A genetic search generator in the SPICE embodiment includes an initialize method called from the runCompoundExperiment method. The initialize method, in one embodiment, prompts the user to enter a population size. The population size corresponds to a number or pool of prior experiments from which the specification of two parent experiments will be selected to generate an experiment specification for a new experiment. The initialize method may also prompt the user for a number of generations which corresponds to the number of experiments the generator will run wherein inputs are drawn from the inputs of two parent experiments.

The genetic search strategy may be used on any type of problem. One such problem, for example, may be to maximize profits given a collection of inputs relating to a business (e.g., sales price, inventory quantity, number of employees, employee cost, facilities cost, etc.) each input having a range of possible values. An associated experiment calculates a profit based on a particular value of each input. Each experiment can be scored based on the output profit value, the higher the better.

After acquiring the population size and generation values, the initialize method of the genetic generator runs a number of experiments equal to the number specified by the population size value. To do this, the runCompoundExperiment method includes a loop structure controlled by the population size value, wherein, within the loop, the nextSpec method is called which returns a new expSpec object having inputs set randomly as described above in connection with the Monte Carlo generator. The runRequest, resultRequest, and Store methods are also called within the loop. In addition, a storeinitialPool method is also called within the loop which allocates a Score structure for an experiment, storing in a Score variable of the Score structure the output (profit value) and also storing the values of each of the inputs that led the experiment to generate that output. Each Score is stored in a Pool data structure. Thus, when the loop terminates, a number of experiments will have been run according to the population size, and an equal number of initial Score structures will have been produced.

For each generation, the runCompoundExperiment method of this generator creates a new experiment based on two "parents" selected from those in the pool. In one embodiment, parents are selected randomly with probabilities proportional to their relative scores. A "roulette wheel" algorithm facilitates this approach. The runCompoundExperiment method calculates the total of all Scores, places that value in a TotalScore variable, then generates a uniform random number, RandVal, in the range of 0 to TotalScore. The method next initializes a counter to zero (0). The method adds the first Score in the pool structure to the counter and continues from Score to Score in the pool structure, adding each Score to the counter. The method selects the Score which, when added to the counter, causes the counter to exceed the value of RandVal.

The runCompoudExperiment method of the genetic generator includes another loop controlled by the value of the generations value. Within this loop, the runCompoundExperiment method selects two parents from the pool, using the roulette wheel selection technique described above. When two parents have been identified, a new expSpec is created, by first requesting a blank expSpec from the expDomain object and next setting the inputs of the new expSpec by using a random combination of the inputs of the two selected "parent" Score structures. In one embodiment, a random separation technique is used to combine the inputs, although the combination may be performed in many different ways. Thus, if the number of inputs is m, then a random number r between one and m is generated. Inputs one through r from the first selected Score structure are then included in the new expSpec, and inputs r+1 through m from the second selected Score structure are included in the new expSpec. Then, for each Entry in the new expSpec object, another random number is generated, and, if the random number is less than a certain threshold (corresponding to a tunable "mutation" rate), that Entry is altered by a random amount.

The runCompoundExperiment method then executes an experiment using the new expSpec. After retrieving the results and storing them in the outcomeStore, the runCompoundExperiment method places the experiment (expSpec and Score) in the pool data structure, replacing the experiment having the lowest Score. The loop then repeats to perform a number of experiments equal to the number of generations specified.

The abstract data type of the class generator provides the methods for interfacing with CEVM and the outcomeStore objects. In the SPICE embodiment, these methods advantageously customize themselves based upon the declaration of the experimental domain, see above. This allows new generator instances to be created by programmers without detailed knowledge of the implementation of the SPICE base classes.

In the SPICE embodiment, a variety of general purpose generators are advantageously included in a generator library. Thus, by simply creating an experiment and defining its inputs and outputs, a user may apply powerful search strategies across the entire range of all specified inputs with no additional work. The flexible framework of the present invention permits additional generators to be easily produced and added to the generator library.

Dispatch

In the SPICE embodiment, an abstract type called Dispatch encapsulates a mechanism for causing each experiment to be run by a computer. The Dispatch class has two methods, runRequest and resultRequest, each exposed to other components of SPICE to present a standardized interface to a Dispatch object. A generator invokes the runRequest method identifying an expSpec object with one parameter and a CEVM with another. The runRequest method issues an appropriate call to the computer operating system (e.g., UNIX, Microsoft Windows NT 4.0, etc.) to run the CEVM object's run method and provides the expSpec object as a parameter. In the SPICE embodiment, this is done under Unix by dynamically loading a CEVM which has been compiled as a shared library. It is well known in the art to issue a call from an application program to an operating system to cause the operating system to run a program, and the present invention is not limited by any such call. Thus, the experiment encapsulated in the CEVM runs on a computer using inputs from the expSpec object. The CEVM returns an expResult object on completion.

The Dispatch object receives the produced expResult object and buffers it in RAM along with the expSpec object that provided the corresponding inputs. When another object, typically a generator, calls the resultRequest method of the Dispatch object, then the resultRequest method returns one buffered expSpec object which provided inputs to an experiment and a corresponding expResult object holding the outcomes generated by that experiment.

In the SPICE embodiment, a user may choose (by a mode button on the user interface) whether the runRequest method should check the outcomeStore to determine whether the newly requested experiment has already been run. If an experiment has already been run, then result data is simply retrieved from the outcomeStore, avoiding the execution of a redundant experiment. In this manner, a display object creating an array of values for a graphical image may get data either from newly run experiments or from stored results. Thus, in the SPICE embodiment, it is transparent to other objects in the system whether an outcome object is produced by submitting the specification (input) to the CEVM or to the outcomeStore. This allows SPICE to be operated in a variety of modes:

a generator can be invoked to run a series of experiments in the background, with the results stored in an outcomeStore object where they can later be visualized;

compound computational experiments can be executed and displayed (plotted) in real time, with no storage of results in an outcomeStore;

an outcomeStore can be used as a results cache. User requests are serviced from the outcomeStore if possible, otherwise the experiment is conducted and displayed in real-time, and possibly stored for future use. In this mode, experiments can advantageously be run opportunistically, in anticipation of future user needs, storing the outcomes for later use, within the constraints of storage limitations.

The Dispatch class also includes functionality that allows SPICE to exploit the parallel execution of compound computational experiments over networks of computers. This is accomplished by having separate methods for submitting a specification for a computational experiment (i.e., the runRequest method), and for requesting the result of that experiment (i.e., the resultRequest method). This allows the process requesting the experiments to queue arbitrary numbers of them before requesting a result. The runRequest method, which takes as inputs a pointer to an expSpec object and a pointer to a CEVM, distributes experiments across available processors.

In the SPICE embodiment, this distribution is accomplished with Unix sockets wherein the user has an account on each computer on the network that may run experiments, and each such computer includes a local copy of the relevant CEVM at a location accessible given the user's privileges on the respective computer. When a generator invokes the runRequest method but no computer is available to run the experiment, the runRequest method stores the pointers to an expspec object 402 and to a CEVM object 304 in a FIFO structure in RAM. When a running experiment completes, the dispatch object accesses the next expSpec object 402 pointer and CEVM object 304 pointer from the FIFO structure and directs the operating system of the now available computer to run the CEVM using inputs from the expSpec object 402. It will be appreciated by those of ordinary skill that a variety of techniques, such as the Parallel Virtual Machine (PVM) or Message Passing Interface (MPI) software systems, exist for distributing programs for execution across computers on a network. The present invention is not limited by any program distribution system or method.

Figure 8:
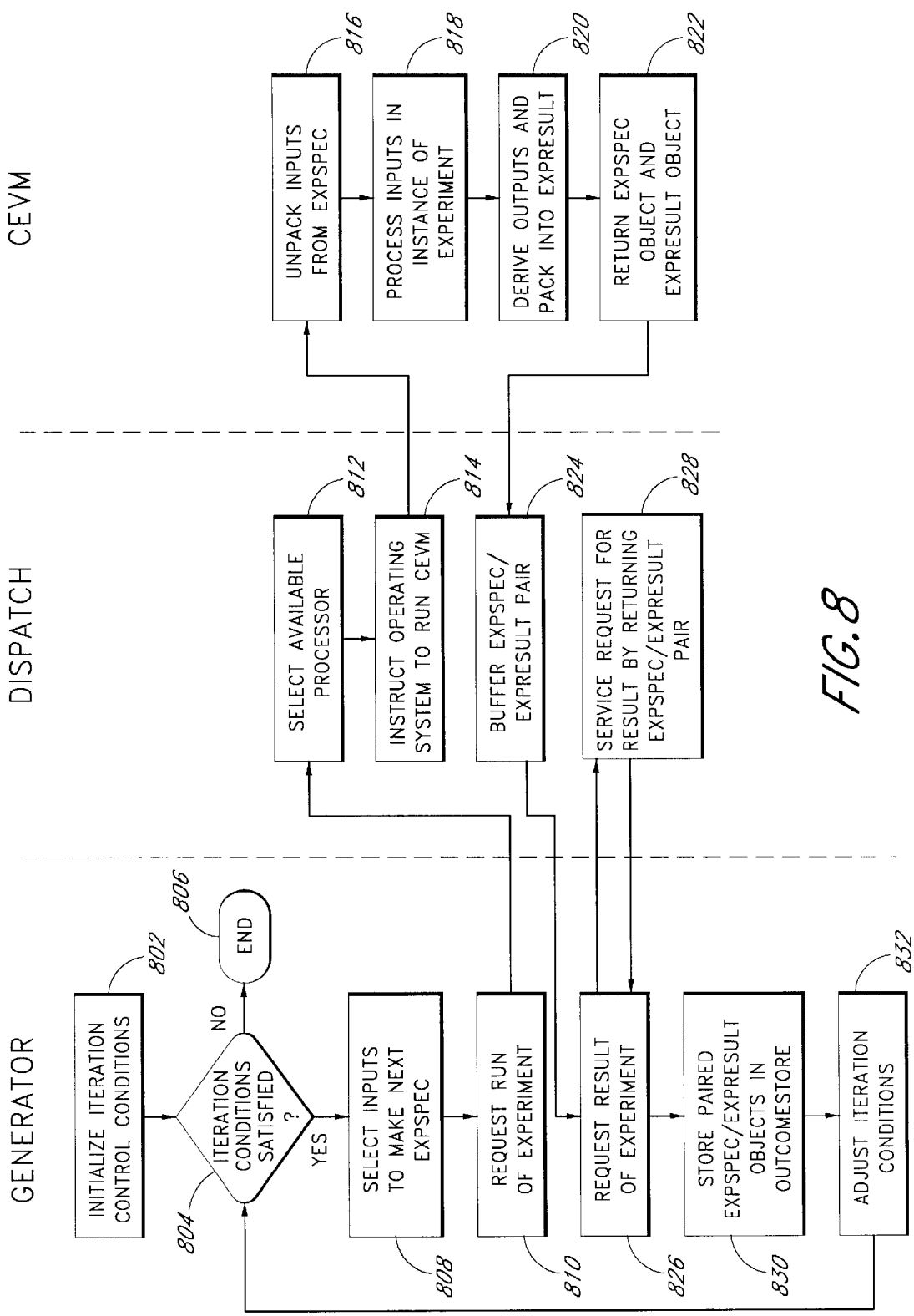
FIG. 8 is a flowchart representing general steps in one embodiment of the invention to run a series of experiments.

FIG. 8 is a flowchart representing general steps in one embodiment of the invention to run a series of experiments. In a first step 802, an initialize method of a generator 306 initializes conditions for controlling iteration of an experiment. It will be appreciated that the range of possible conditions for controlling iteration of an experiment is virtually limitless. However, as one example, the initialize method may prompt the user with a dialog box to enter a number of experiments. In that embodiment, the number entered represents an iteration condition which will continue to be satisfied until the number of experiments run equals the number entered.

In a next step 804, a loop structure in a runCompoundExperiment method of the generator 306 tests the iteration conditions to determine whether the series of experiments is completed. If, in the step 804, the iteration conditions are not satisfied, then the generator 306 terminates in a step 806. Otherwise, if the iterations conditions are satisfied in the step 804, then, in a next step 808, a nextSpec method of the generator selects inputs from the range of all possible inputs for the experiment, and returns an expSpec object 402 including the selected inputs. The present invention advantageously wholly encapsulates the input values for an experiment in an object which may then be combined with the experiment, wholly encapsulated in another object, to produce results. This architecture advantageously isolates the critical task of varying inputs from experiment to experiment and allows each distinct set of inputs to be identified and packaged in the most efficient manner possible with no concern for the specific structure of the experiment itself. Thus, in accordance with the SPICE embodiment of the present invention, input values are packaged in expSpec objects, and the expSpec objects may easily be generated at prodigious rates, each to be combined with a CEVM instance to perform an experiment. It will be appreciated, as described above, that the number of ways of selecting particular input values from all possible input values is virtually infinite and that the steps in FIG. 8 are general and correspond to a single embodiment of the present invention. Thus, generators in accordance with the present invention may not adhere strictly to the steps illustrated in FIG. 8.

In a step 810, the runCompoundExperiment method of the generator 306 invokes the runrequest method of the dispatch object 318, passing pointers to an expSpec object 402 and a CEVM object 304 as input parameters. The particular modular structure of the present invention advantageously permits the generator 306 to request that its experiments be run, while having no connection, shared data, or any construct whatsoever related to the process by which the experiment is run. The generator 306 may simply rely on the runRequest method to run the experiment. Again, it will be appreciated that the steps in FIG. 8 are general and describe one embodiment only, and dispatch objects according to the present invention may not adhere precisely to the steps in FIG. 8.

In a further step 812 the runRequest method of the dispatch object 318 selects an available processor to run the experiment encapsulated in the CEVM object 304. The processor may reside in the same computer running the dispatch object, may be one of a plurality of processors in that computer, or may be a processor in a computer on a network. Upon locating an available processor, the runRequest method, in a step 814, instructs the operating system controlling the processor to run the encapsulated experiment. By wholly encapsulating the experiment in an object and its particular input values in another object, not only does the architecture advantageously isolate the identification and packaging of input values, but also the architecture trivializes the movement of the experiment along with any particular package of input values between processors or between computers to be executed at the point of greatest capacity.

In a next step 816, the experiment encapsulated in the CEVM object 304 begins executing and unpacks input values from the expSpec object 402. In a step 818, the experiment processes the inputs and, in a further step 820, derives or calculates outputs and packs them into an expResult object 404. In a still further step 822, the experiment returns an expResult object 404 containing the produced outputs and returns the expSpec object 402 providing the input values.

In a step 824, the runRequest method of the dispatch object 318 buffers in RAM pointers to the returned expSpec object 402 and expResult object 404. In a next step 826, the runCompoundExperiment method of the generator 306 invokes the resultRequest method of the dispatch object 318. In a further step 828, the resultRequest method retrieves the pointers buffered in RAM and returns the pointers to the runCompoundExperiment method which, in a next step 830, invokes the Store method of the outcomeStore 328 to store the pair of objects together in a record of the outcomeStore 328. In a step 832, the runCompoundExperiment method adjusts the iteration conditions which are again tested in the step 804.

Transform Functions

To better understand the implications of compound computational experiments, it can be useful to transform the results in various ways. For example, a multidimensional outcomeStore may be processed to produce a data object having fewer (e.g., 2 or 3) dimensions to facilitate representing particular dimensions in a graphic display. As another example, a user may want to visualize or explore results for a limited region of input or output values and, in such cases, the ability to selectively include only specified experiments in a visualization or selectively exclude specified experiments from a visualization can prove advantageous.

Transformations on outcomeStore objects can also improve the efficiency of compound experimentation. For example, a user may desire to adapt the results of a series of previously run experiments to explore a new problem having slightly different dimensions. Thus, a travel model having ten (10) inputs, two of which are "miles traveled" and "gallons of fuel" may be adapted into a modified travel problem having nine (9) inputs, one of which is "miles per gallon." A user desiring such an adaptation would benefit from a transformer which applies a function (e.g., $f(i,j)=i/j$) against certain inputs or outputs of an existing outcomeStore to produce a new outcomeStore having different experiment dimensions. Such a transformer extends the utility of results of previously run experiments, and may avoid the inefficient running of one or more series of similar experiments.

The SPICE embodiment includes transform abstract types which advantageously transform outcomeStores to make problem exploration more effective and efficient. SPICE provides abstract classes for three types of operations, filters, transformers, and collapsers. Filters produce a subset of an outcomeStore including only those cases that satisfy a specified condition. Transformers use the values of one outcomeStore to produce a new outcomeStore with a different internal structure (hence corresponding to a different expDomain). Finally, collapsers reformat the data in an outcomeStore to a form used by graphical display routines (see below).

Filters are used with the extract method of the outcomeStore to iterate through the records of the outcomeStore (each record including one pointer to an expSpec object 402 and a pointer to an expResult object 404). The extract method tests a record for some condition (e.g., is the value of the 4th Entry object of the expSpec object less than 10, greater than 0, or equal to the value of the 2nd Entry object of the expResult object 404). If the condition is satisfied, then the record is included in a new object of type outcomeStore.

Filters are objects which encapsulate such conditions. Filters are useful, for example, to enable the operation of slider bar controls on a graphical user interface (GUI) corresponding to dimensions not illustrated in a plot or graph. In particular, a filter used in such a case selects from an outcomeStore only those experiment records consistent with the slider bar settings.

The abstract type transformer produces a new outcomeStore 334 by performing some transformation on data in an existing outcomeStore 328. A transformer object includes a method called transform which accesses each record of an existing outcomeStore in one domain, and modifies the associated expSpec object and expResult object to correspond to another expDomain. For example, a transform method could swap or interchange an Entry object from the expSpec object 402 of each record with an Entry object in the expResult 404 of the same record. Such a transform can be used to convert existing data to the format of a desired domain based on a compound experiment that uses the output of the original expResult as an input and one of the original inputs as an output. Alternatively, a transform method could automatically construct a synthetic expDomain object, by first requesting a blank copy of an existing expDomain (invoking a factory method of the expDomain), then populating the expDimension objects of the synthetic domain by copying expDimension objects from the existing expDomain, but using the information from an output-related expDimension object from the existing expDomain to replace one of the input-related expDimension objects, and using information from the replaced input-related expDimension object to create an output-related expDimension object in the synthetic expDomain. The transform method automatically generates annotations (text comments stored in the expDomain) which explain the origin of the synthetic expDomain (e.g., created on Jan. 11, 1998 at 10:35:43 implementing swap of Max_Thres input and Metric output). Having thus created a synthetic expDomain, the transform method invokes a generator to perform a compound experiment based on the new synthetic expDomain and to generate a new outcomeStore object including results corresponding to a new experimental domain. Another possible transform method reduces the number of inputs in a new outcomeStore by averaging together two inputs from an existing outcomeStore.

The abstract type collapser includes a method called projection. Generally, each graphic display type (2-D box plot, colored region plot, colored point cloud, etc.) has a corresponding collapser with a projection method designed to generate a plot-oriented data structure including dimensions appropriate for the particular graphic display or plot type. When a user selects a graphic display type or plot type to visualize the results of a compound experiment, the GUI presents the user with menus corresponding to the possible dimensions of the experiment. The user selects particular dimensions of interest, the number of dimensions related to the particular plot type.

If the user is plotting directly from an outcomeStore of previously run. experiments, then, upon the user selecting the plot button from the GUI, the projection method extracts records (using the extract method of the outcomeStore) from the outcomeStore, copies values from Entry objects corresponding to the selected dimensions into a data structure appropriate for the plot type (see below), ignoring other entries.

Displays

The Spice embodiment of the present invention includes a variety of graphical display options for visualizing the results of compound computational experiments. These include a 2-D box plot, a contoured region plot, a surface plot, a function plot and a colored point cloud plot. The present invention is not limited by a type of plot. In the SPICE embodiment, each type of plot corresponds to a subclass of a display abstract type implemented in the JAVA programming language. Each plot subclass is characterized by an organization of data supporting the respective plot. These plot-oriented data structures include:

Array1DPlotVals
  Linear array of values to be plotted
Array2DPlotVals
  2 dimensional array of values to be plotted
Array3DPlotVals
  3 dimensional array of values to be plotted
2DList
  unordered collection of (x,y) pairs to be plotted
3DList
  unordered collection of (x,y,z) triplets to be plotted In addition to including one of the plot-oriented data structures, each plot object includes information related to plot construction, including plot title, axis labels, and color palettes as appropriate. In the SPICE embodiment, a plot method of a plot object is generally invoked when results of experiments are available, but may also be invoked to await results as they become available.

Generally, from a graphical user interface (GUI), a user selects a plot type from a list of plot types, selects input dimensions from those within the expDomain object, and issues a plot command (clicks on a command button labelled "plot"). As described in more detail elsewhere, a series of experiments is run, resulting in the storage of result data in an outcomeStore. After possible application of a filter against the outcomeStore, a collapser iterates through all selected records of the outcomeStore and returns a plot-oriented data structure to an action module associated with the plot type selected from the GUI.

The action module invokes the plot method associated with plot object corresponding to the selected plot type. Within a window displayed on a computer screen, the plot method draws axes (two axes in the case of a two-dimensional plot) and scales the axes according to the range for each selected dimension (which may be specified in an associated expDimension object of the expDomain object). The plot method places labels (identifier names specified in expDimension objects) along the axes. Then, for each experiment represented in the plot-oriented data structure, the plot method calculates a position relative to the two axes at which to place a mark (e.g., a colored point in the case of a point cloud plot). Thus, a user visualizes the results along particular dimensions of an experiment. Plotting points or drawing charts or graphs based on a series of grouped values is well known in the art and the present invention is not limited by any plotting type.

Constructing Compound Computational Experiments

The present invention minimizes and makes manageable the task of constructing an experimental mechanism that can be used in a system which may execute arbitrary numbers experiments as needed to explore the nature of a particular problem. The invention provides a standard interface for CEVM objects which connect the system with the transformations or calculations comprising the experiment. The CEVM acts as a conduit to the system, translating inputs generated by the system to the form required by the experiment, and extracting outputs of iterations of the experiment for exploration by the user. The user may optionally specify functions, transformations or calculations forming all or part of an experiment in the experiment module.

The invention further permits a user to specify the universe of inputs to and outputs of an experiment by exposing a domain module to the user. In the domain module, the user identifies the types of inputs and the ranges each may take over any number of iterations of an experiment. In addition, the user may exclude particular values of inputs from the universe of inputs. The user also identifies the outputs of an experiment that may provide information useful in the exploration of a problem.

The SPICE embodiment permits a user to create a Compound Experiment Virtual Machine (CEVM) which expresses and encapsulates a user-defined experiment. In the SPICE environment, a CEVM may form the basis of many hundreds, thousands or millions of experiments, each run automatically under varying conditions to provide information regarding a problem.

To specify the universe of inputs to an experiment and the outputs of interest, the user, in the SPICE embodiment, names each input and output, identifies the type of each input and output, and specifies a range of values for each input.

1. Creating a CEVM Class

A user may create a CEVM class by embedding a collection of computer language instructions in a CEVM template module to create a CEVM source code module. The embedded instructions constitute an experiment or model (i.e., an algorithm, process, or one or more functions, transforms or calculations) the user believes might be useful in addressing a particular problem. Generally, an experiment responds to one or more inputs to produce one or more outputs. The following is an example of how a model that performs a computational experiment could be called from within a CEVM.

eters depends solely on the user's specification of the experiment, including which inputs and outputs of particular types are useful in addressing the problem to be explored.

As indicated in the above example, the logic of the experiment is generally placed between open and closed braces following the declaration of the subroutine (e.g., exampleExperiment) in accordance with the conventions of the C programming language. The logic representing the experiment may be of any complexity but would be expressed typically in a series of computer programming language instructions. The instructions may be keyed in by the user using a common text editor, or may be electronically "cut" from an existing computer language source code file and "pasted" into the CEVM template module.

A CEVM in the SPICE embodiment includes a run method which, when requested by an external module, in turn calls the user's experiment and causes the instructions of the model to be executed. Thus, a CEVM source code module defines a run method in addition to the user experiment. The run method, exposed to external components of SPICE, generally accepts two parameters: a structure specifying inputs to an experiment, and a structure for receiving output values produced by an experiment. The run method calls the user's experiment, passing to it the specified inputs and, upon completion of the experiment, places output values in the output structure.

When an external module requests that an experiment be run, the external module provides two parameters to the CEVM run method, namely a pointer to an expSpec object and a pointer to an expResult object. Prior to calling the experiment, the run method unpacks or extracts values from the expSpec object and places the values in variables declared locally to the run method.

The run method defines a call to the user's experiment including input and output parameters. The run method supplies values for the input and output parameters by specifying the local variables as the input and output parameters when the run method calls the user's experiment. When the user's experiment completes, it returns values for the

```
// template for the call to the experiment
void exampleExperiment(    float mu_1, float mu_2, float mu_3,
                           float sig_1, float sig_2, float sig_3,
                           int Max_Thres, int Some_Thres, int Rate_Thres
                           int Num_Innoc, float &Metric, int &Type_I,
                           int &Type_II )
{
    // Logic for model goes here
    //
    // use input values from parameter variables:
    //    mu_1, mu_2, mu_3, sig_1, sig_2, sig_3,
    //    Max_Thres, Some_Thres, Rate_Thres, and Num_Innoc
    //
    // return output values at addresses provided by parameter variables:
    //    Metric, Type_I, Type_II
    //
}
```

As will be immediately appreciated by one of ordinary skill in the art, the above CEVM template module, specified in the programming language, "C," defines an experiment as a subroutine having thirteen (13) parameters, ten (10) input parameters and (3) output parameters. The invention does not require that the experiment be expressed in C, nor does it require that an experiment have thirteen or any particular number of parameters. The number and type of the paramoutputs in specified local variables of the run method. The run method then packs or inserts the outputs into the expResult object provided by the external module that requested the run. The following example of a CEVM run method illustrates one technique in the SPICE embodiment for extracting values from an expSpec object, for calling a user's experiment with the extracted values as parameters, and for inserting returned outputs into an expSpec object.

```
//run method
void run(expSpec * spec, expResult * result)
{
//declare local variables to hold experiment inputs
        float mu_1, mu_2, mu_3, sig_1, sig_2, sig_3;
        int Max_Thres, Some_Thres, Rate_Thres, Num_Innoc;
//declare local variables to hold experiment outputs
        float Metric;
        int Type_I, Type_II;
//unpack the experiment input values from the expSpec
        mu_1 = spec->getFloatSpec(0);
        sig_1 = spec->getFloatSpec(1);
        mu_2 = spec->getFloatSpec(2);
        sig_2 = spec->getFloatSpec(3);
        mu_3 = spec->getFloatSpec(4);
        sig_3 = spec->getFloatSpec(5);
        Max_Thres   = spec->getIntSpec(6);
        Some_Thres  = spec->getIntSpec(7);
        Rate_Thres  = spec->getIntSpec(8);
        Num_Innoc   = spec->getIntSpec(9);
//call the model
        exampleExperiment( mu_1, mu_2, mu_3,
                           sig_1, sig_2, sig_3,
                           Max_Thres, Some_Thres,
                           Rate_Thres, Num_Innoc
                           Metric, Type_I, Type_II );
//pack the results into the result object
        result->setResult(0,Metric);
        result->setResult(1,Type_I);
        result->setResult(2,Type_II);
}
```

One of ordinary skill in the art will appreciate that, in the above example, getIntSpec and getFloatSpec are methods associated with the expSpec object which respectively return integer and floating point values from input entries, specified by sequential number, of the expSpec object. Likewise, the setresult method of the expResult object sets the value of an output variable in the setResult object.

Once the instructions comprising the logic of the experiment are in place, along with corresponding provisions in a run method which call the experiment, pass inputs to the experiment and receive outputs from the experiment, the user compiles the CEVM. In one embodiment of SPICE, the user invokes a "C++" programming language compiler and provides the CEVM source code module as input. As will be readily appreciated by those of ordinary skill, the C++ compiler generates a CEVM object module. In the SPICE embodiment, the CEVM module is compiled into a shared library and, consequently, does not need to be compiled into a system. Shared library implementations are well known in the art and the present invention is not limited by the use of a shared library.

2. Creating A Domain Object

To specify the universe of inputs and outputs in the SPICE embodiment, the user produces a declaration or DCL file which is automatically converted into an expDomain object. To produce a DCL file, the user may key in text in accordance with certain keywords and conventions, or may generate a DCL through interacting with a user interface. Understanding the keywords and constructs involved in the preparation of a DCL file is simple and, thus, it is more efficient to simply key in the text of a DCL using a standard text editor.

In the DCL file, the user provides the name of the domain object, specifies the types of variables that may be declared in the DCL file, and identifies a list of attributes that may qualify each variable. Accordingly, the user names the domain by entering the keyword "domainName:" followed by the name of the domain. Generally, the name given to each domain matches the name of an experiment encapsulated by a CEVM, that experiment expecting input and output variables from the universe specified in the DCL file.

In the SPICE embodiment, the universe of inputs to an experiment is identified by providing an "input block." An input block comprises the keyword "input," followed by variable declarations between opening and closing braces ("{, }"). Each variable declaration includes a variable type keyword (i.e., int, float, double, array, etc.), the name of the variable, and attribute settings between square brackets ("[, ]"). Similarly, the user specifies the universe of output variables by providing an "output block." An output block comprises the keyword "output," followed by variable declarations between opening and closing braces ("{, }"). Each output variable declaration includes a variable type keyword (i.e., int, float, double, etc.) followed by possible threshold settings. One purpose of the threshold setting is to define value ranges wherein specific colors are used to plot results.

The following is an example of a DCL file to produce an exampleExperiment domain, specifying ten (10) input variables and three (3) output variables as the universe of inputs and outputs.

```
input {
         float mu_1     [ low = 0.
                          hi = 6.
                          nominal = 1. ]
         float mu_2     [ low = 0.
                          hi = 6.
                          nominal = 1. ]
         float mu_3     [ low = 0.
                          hi = 6.
                          nominal = 1. ]
         float sig_1    [ low = 0.
                          hi = 6.
                          nominal = 1. ]
         float sig_2    [ low = 0.
                          hi = 9.
                          nominal = 1. ]
         float sig_3    [ low = 0.
                          hi = 9.
                          nominal = 1. ]
         int Max_Thres  [ low = 90
                          hi = 100
                          nominal = 95 ]
         int Some_Thres [ low = 0
                          hi = 10
                          nominal = 5 ]
         int Rate_Thres [ low = 0
                          hi = 1000
                          nominal = 50 ]
         int Num_Innoc  [ low = 4
                          hi = 48
                          nominal = 4 ]         }
output {
    float Metric    [ thresholds = 3, 6, 9, 12 ]
    float Type_I    [ thresholds = 5, 10, 15, 20, 25, 30 ]
    float Type_II   [ thresholds = 2, 4, 8, 16, 32, 64, 128 ]
}
```

In the SPICE embodiment, the user activates a domain parser (implemented as a method of the expDomain class) which accepts a DCL file as input, and generates an expDomain object as output. In one embodiment, the expDomain class and corresponding parser method are implemented in the JAVA programming language, and the user invokes the parser from a graphical user interface. Parsers which accept input files including keywords and variable tokens arranged in accordance with predetermined grammar rules or conventions are well known in the art, and the present invention is not limited by any particular parser.

Performing Compound Computational Experiments

The classes in the SPICE embodiment implement a general purpose analytic environment. This environment allows computational experiments to be completely encapsulated in CEVM objects, and further allows the CEVM objects to be treated as primitives or atomic components manipulable by the fall range of SPICE behaviors through a graphical user interface (GUI). While a wide variety of systems could be constructed using the SPICE classes, this general purpose environment serves to demonstrate its capabilities.

In order to accomplish particular operations for the user, specific instances of generators, filter/collapsers, and displays need to be invoked and connected logically. The initial invocation of these objects may be performed by the user through the GUI. Panels of the GUI allow the user to perform compound computational experiments.

Figure 9:
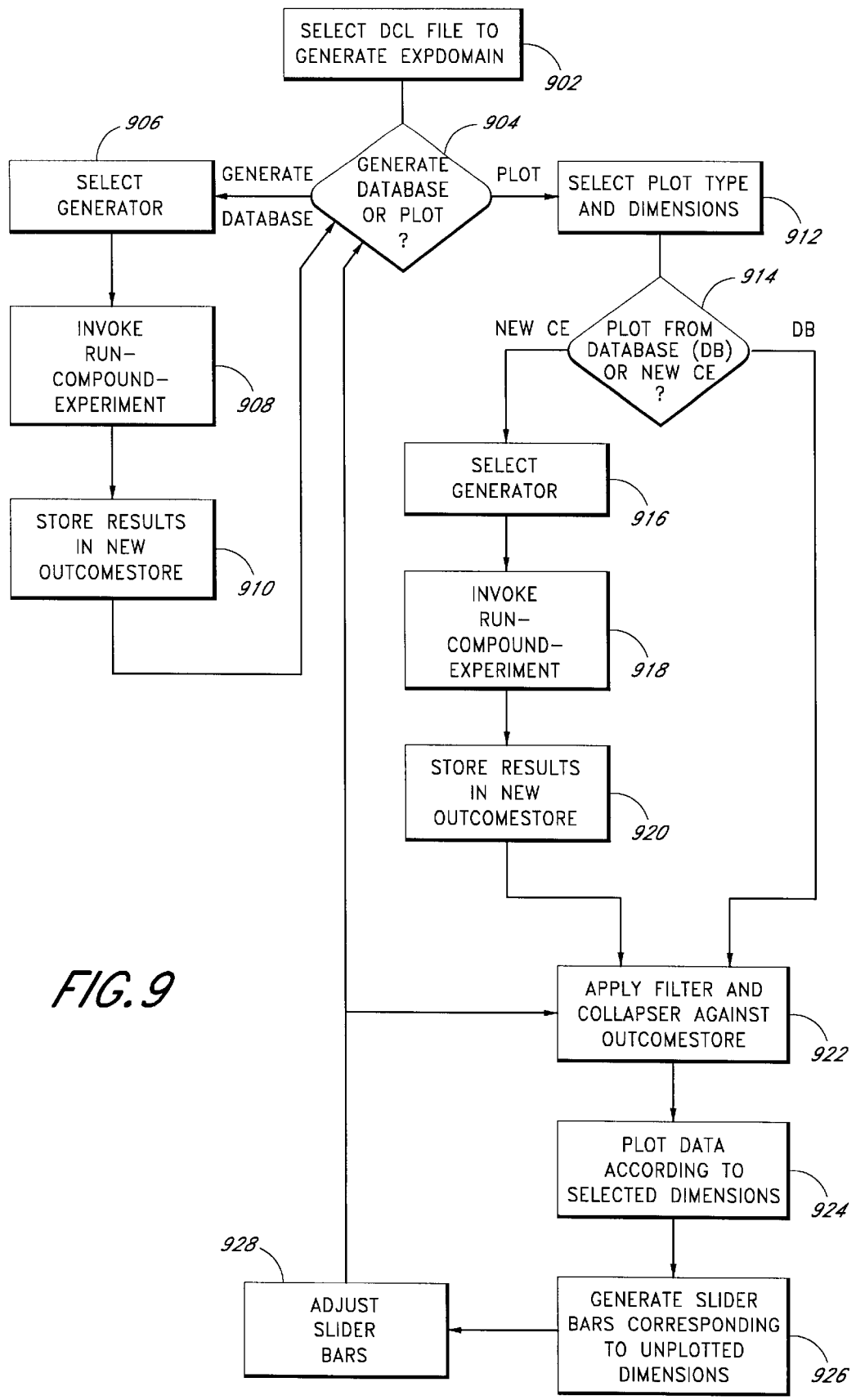
FIG. 9 represents steps in accordance with one embodiment of the present invention for running a compound experiment, visualizing the results of a compound experiment or both.
Figure 10:
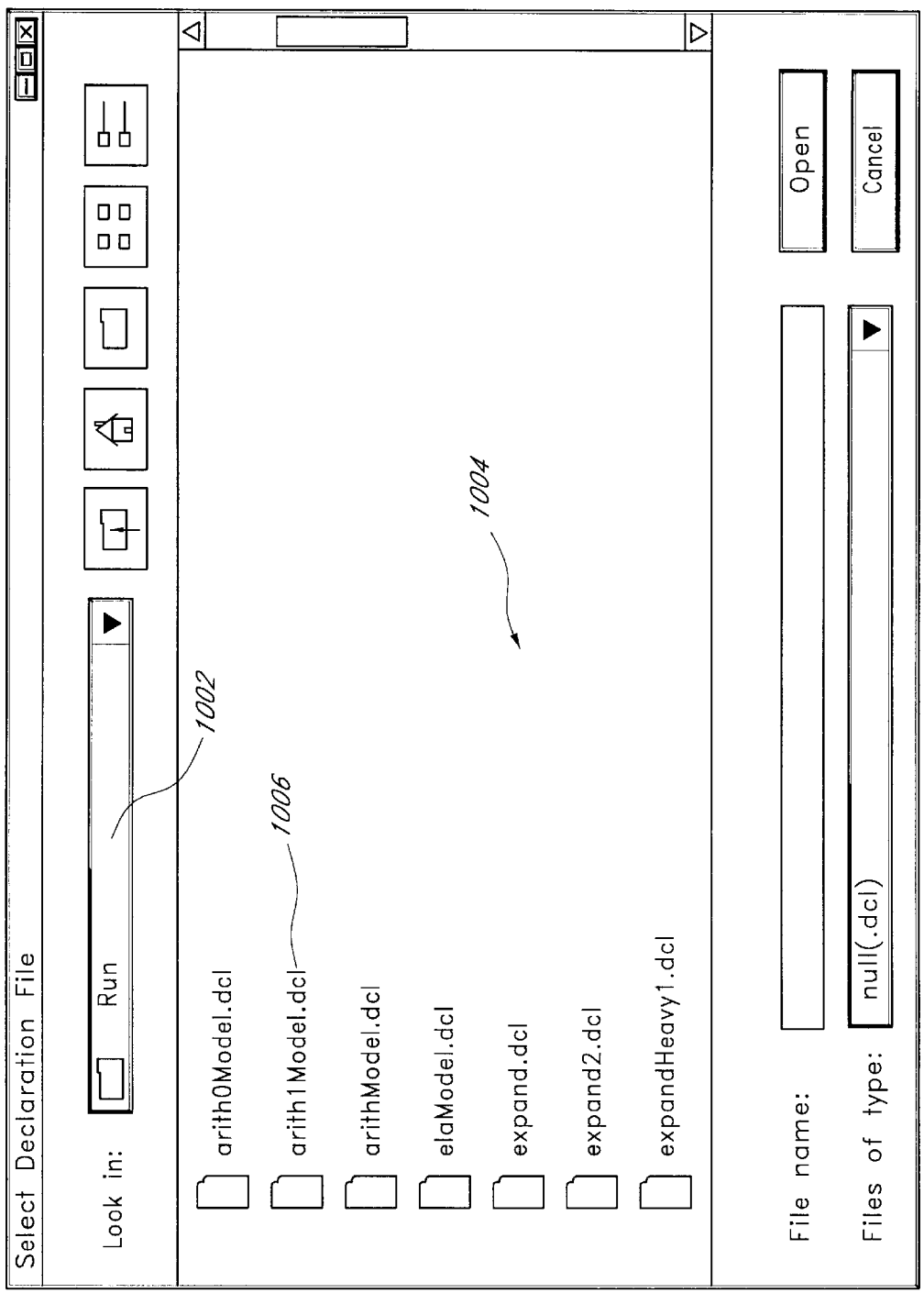
FIG. 10 illustrates a representation of a user interface permitting a user of one embodiment of the present invention to browse directories or folders to select a DCL (declaration) file.

FIG. 9 represents steps in accordance with one embodiment of the present invention for running a compound experiment, visualizing the results of a compound experiment or both. In a step 902, a user selects a DCL file using a graphical user interface (GUI). FIG. 10 illustrates a representation of a user interface permitting a user to browse directories or folders and to select a DCL file. A drop down list box 1002 labelled "Look in:" lists possible folders that may include DCL files. A primary scrollable list box 1004 includes a list of DCL files. A user may select one, for example "arithModel.dcl" 1006, by double-clicking on that name.

Once the user selects a DCL, a DCL selection event is generated by the GUI, and instructions responsive to the DCL selection event invoke the parser method of the expDomain class to parse the DCL file. The parser scans the DCL file, extracts data from the DCL (e.g., input and output variable names and types and ranges of values for input variables) and uses that data to create and populate expDimension objects which the parser combines with other information to generate an expDomain object identifying the universe of inputs for a compound experiment.

Figure 11:
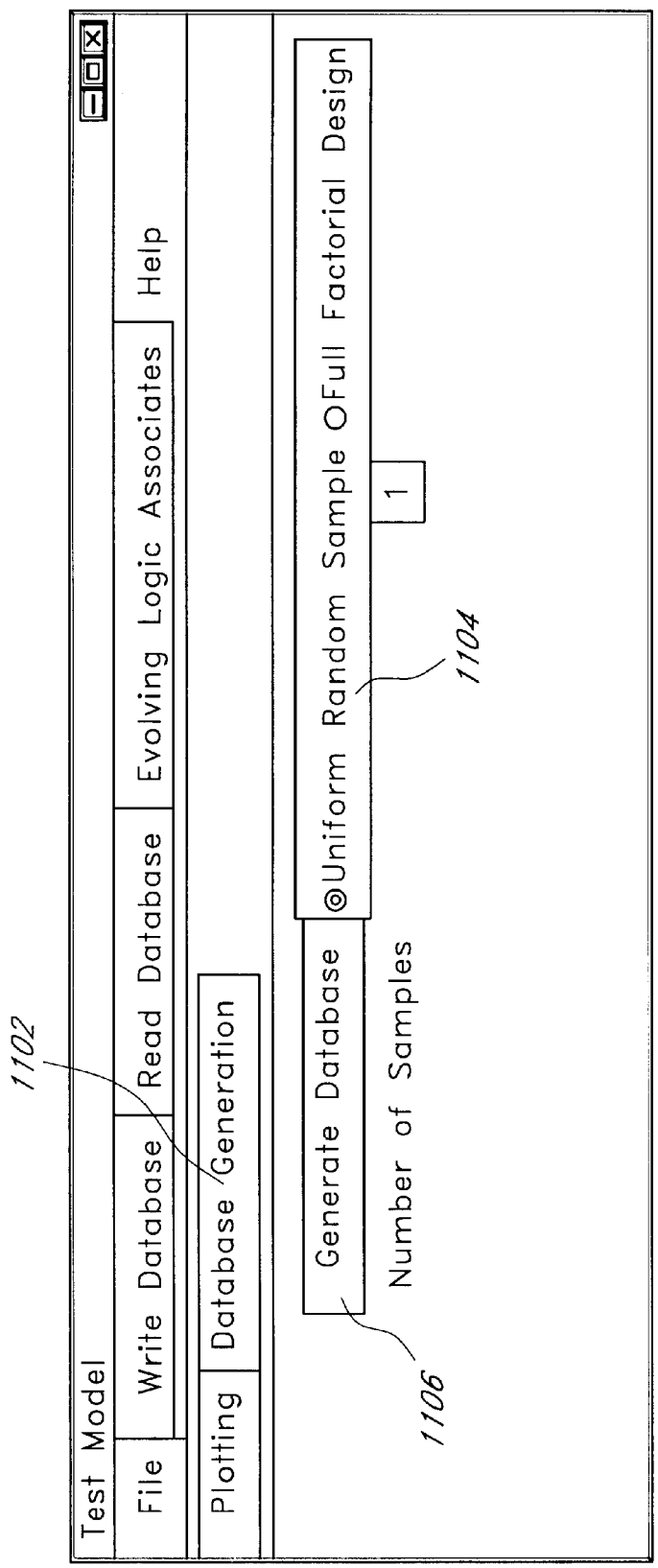
FIG. 11 illustrates a representation of a user interface in accordance with one embodiment of the present invention for generating a results database or outcomeStore.

As further shown in FIG. 9, in a next step 904, the user elects to generate a new results database (produce a new outcomeStore object) by running the compound experiment or to generate a new results database and also plot particular dimensions of the experiment. If, in the step 904, the user chooses to generate a results database, then, in a next step 906, the user selects a generator to be used for the compound experiment. FIG. 11 illustrates a representation of a user interface in accordance with one embodiment of the present invention for generating a results database (in the SPICE embodiment, an outcomeStore). A user elects to generate a results database by clicking on a tab button labelled "Database Generation" 1102. Similarly a user selects a generator by clicking an option button 1104 next to the name of the desired generator.

In FIG. 9, in a next step 908, the user invokes the runCompoundExperiment method of the selected generator by clicking on a generate database command button 1106 (see FIG. 11). In a further step 910, the results of the compound experiment are retrieved by the runCompoundExperiment method and stored in a new outcomeStore. Once the new outcomeStore is generated, the user may decide to visualize results in the outcomeStore by choosing to plot results from a database (described in more detail below).

Figure 12:
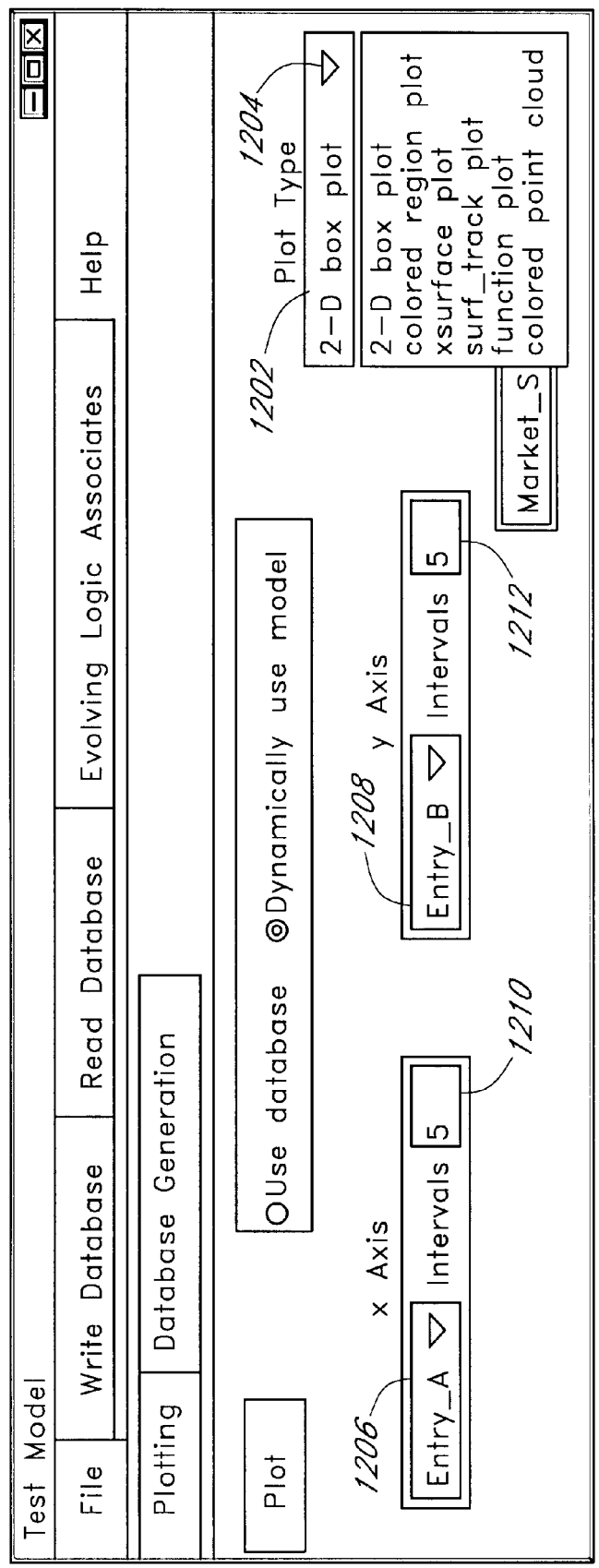
FIG. 12 illustrates a representation of a user interface permitting a user, in accordance with one embodiment of the present invention, to select a plot type and dimensions.

If, in the step 904, the user chooses to plot the compound experiment, then, in a next step 912, the user selects the plot type and dimensions to use for the plot. FIG. 12 illustrates a user interface including a drop down list box 1202 which, when activated by clicking on the down arrow 1204, lists available plot types. The user selects a plot type by clicking on one of the plot type names (e.g., "2-D box plot"). Selecting a plot type generates a plot type selection event. Instructions associated with the GUI, responsive to the plot type selection event, store an identifier unique to the selected plot in a plotType variable.

The user selects dimensions for each axis of the plot by activating drop down list boxes 1206, 1208, listing the names of each available dimension (as specified in the expDomain object). Clicking on a dimension name generates a dimension selection event, whereupon instructions of the GUI, sensitive to that event, store an identifier unique to the selected dimension in a dimension variable. The dimension variables are used later to extract particular result data from the outcomeStore object to be plotted. A user may also specify interval values to mark increments along each axis for plotting. The intervals are selected by entering a number corresponding to the interval increment in a text field 1210, 1212 adjacent to each dimension list box 1206, 1208.

In FIG. 9, in a step 914, the user selects whether to plot results to be generated by running a compound experiment or to plot results from a database containing results of previously run compound experiments. If, in the step 914, the user elects to plot results obtained from running a new compound experiment, then, in steps 916, 918, 920 the user selects a generator and invokes the runCompoundExperiment method of the generator which stores results in a new outcomeStore as described in more detail with respect to other steps 906, 908, 910.

In a next step 922, a filter may be run against the outcomeStore to produce a different, likely smaller outcomeStore, including only those records having values corresponding to nominal values in dimensions not selected for plotting (nominal values for input dimensions are included in expDimension objects of the expDomain object). The step 922 would be performed if, in the step 914, the user selected to plot results from a results database.

In the step 922, a collapser may be run against the new outcomeStore produced by the filter, to populate a plot-oriented data structure appropriate for the plot type selected. Thus, values corresponding to the dimensions selected for plotting are extracted from each record in the new outcomeStore and stored in the plot-oriented data structure. In a next step 924, the plot method of the plot object corresponding to the plot type selected, draws and labels axes (on a computer screen) corresponding to the dimensions selected for plotting. The plot method then accesses values from the plot-oriented data structure, using one value from an experiment to locate a position along a horizontal axis, and another value from the same experiment to locate a position along a vertical axis, and then maps a pixel on the screen at a location where the two values intersect. Each set of values from each experiment is mapped (e.g., in pixel form) to the axes to provide a visualization of the results of the experiment.

Figure 13:
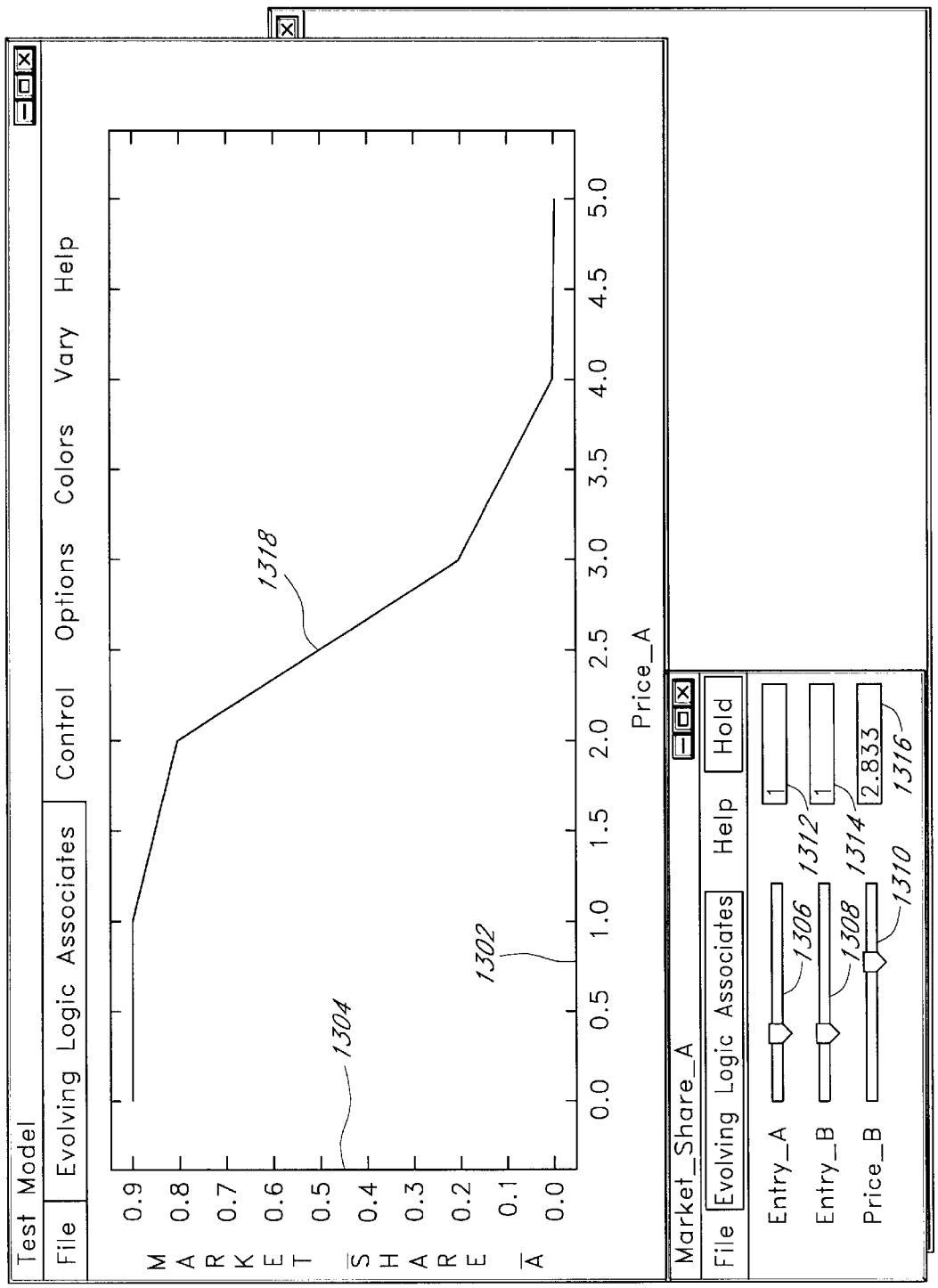
FIG. 13 illustrates a representation of a user interface presenting a plot of results of a compound experiment in accordance with an embodiment of the present invention.

FIG. 13 illustrates a representation of a user interface presenting a plot of results of a compound experiment in accordance with an embodiment of the present invention. A horizontal axis 1302 labelled "Price_A" and divided into increments of 0.5 corresponds with an input dimension of the compound experiment. A vertical axis 1304 labelled "Market_Share_A" and divided into increments of 0.1 corresponds to an output dimension of the compound experiment. A line 1318 plotted along the axes 1302, 1304 permits visualization of variance in the "Market_Share_A" dimension relative to variance in the "Price_A" dimension.

In FIG. 9, in a step 926, user interface controls such as, for example, slider bars are placed on the GUI. These controls are associated with and permit the user to adjust values of particular unplotted dimensions of the compound experiment. In one embodiment, the controls are initialized to nominal values of the unplotted dimensions.

FIG. 13 further illustrates a representation of first, second and third slider bars 1306, 1308, 1310, labelled respectively "Entry_A", "Entry_B" and "Price_B", which correspond to unplotted dimensions of the compound experiment. A user operates the slider bars 1306, 1308 and 1310 (by clicking on a horizontally slidable button of the GUI and moving it right or left with the mouse along the associated horizontal path) to assign values to the unplotted dimensions. The value assigned to each unplotted dimension represented by a slider bar is displayed in a respective text box 1312, 1314, 1316 adjacent to the slider bar. In a typical embodiment, the set of experiment results plotted along the horizontal and vertical axes 1302, 1304 includes only the experiments which used values for the unplotted dimensions equal to the values corresponding to the slider bar settings. Thus, for example, the line 1318 plotted along the axes 1302, 1304 permits visualization of market share values given that the Entry_A input has the value one (1), the Entry_B input has the value one (1), and the Price_B input has the value 2.833.

In FIG. 9, in a next step 928, the user adjusts the slider bars 1306, 1308, 1310 (FIG. 13) to alter the values of the unplotted dimensions. In the SPICE embodiment, this has the effect of plotting results of a different set of experiments, namely the results of those experiments which used values for the unplotted dimensions equal to values set by the slider bars. Such action by the user may cause step 922 to be performed using a filter which selects records from the outcomeStore having values for the unplotted dimensions equivalent to the respective values associated with the slider bars. Steps 924, 926 repeat to allow the user to visualize and compare the results of different sets of experiments.

In one embodiment, each increment of movement of a slider bar causes a slider bar movement event, even though the user has not released the mouse button and may be in the process of moving the slider bar still further. Instructions of the GUI responsive to the slider movement event, immediately cause the steps 922, 924, 926 to be performed. The SPICE embodiment thus provides for dynamic visualization of sets of experiments corresponding to increasing or decreasing values of an unplotted dimension. The speed at which the visualization of experiment sets changes is related to the speed at which a user moves a slider bar 1306, 1308, 1310. This dynamic visualization provides profound reasoning assistance with respect to a problem and, in particular, provides intuitive feedback regarding the roles played by particular dimensions in an experimental domain. It will be appreciated that, in cases where the dynamic feedback is not desired during an adjustment of a slider bar 1306, 1308, 1310 (or other GUI control related to an unplotted dimension), the user may enter a value for a particular dimension by typing the value in a text box 1312, 1314, 1316 adjacent to the slider bar. In response to such action, the visualization will jump to represent a different set of experiments rather than representing a series of different sets of experiments.

Also, for generators that support this feature, as the results of computational experiments are being gradually displayed, the user is able to interact with the display to redirect the case generation process and "steer" the computational experiment. SPICE can be configured so that results of computational experiments are displayed as they are completed (as opposed to returning all experiments results as a group when they are all completed). This allows generators to accept inputs from the user in the middle of a compound computational experiment. A wide variety of options exist whereby a user may interact with a generator such as, for example, where the user uses a mouse to indicate a region on a plot where he or she would like the next experiments to be run. Such interaction allows a user to intuitively steer or guide a compound experiment to focus future series of experiments on particular regions of certain dimensions.

Many user interactions with the user interface have the effect of starting a generator even when the user has not explicitly requested a generator be activated. For example, moving a slider bar can cause a generator to execute the experiments needed to create the new plot the user has requested.

The user interface in the SPICE embodiment thus allows users to browse or search through alternative visualizations of the properties of a compound experiment to assist in reasoning about a problem. The interface allows users to specify compound experiments either by interacting with a control panel or by interacting with one of the graphical displays themselves. In the SPICE embodiment, users can thus visualize results across an entire experiment domain, the experiment domain including all experiments that can be run given a CEVM, an expDomain and a set of generators.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A system for performing compound computational experiments, comprising:

a first plurality of experiments, each of said first plurality of experiments having at least one input, each of said first plurality of experiments including a process contollable by a computer and responsive to said at least one input to produce at least one output, said at least one output capable of being stored on a medium readable by said computer;

a generator capable of running on said computer, said generator automating the performance of said first plurality of experiments, said generator automatically varying said at least one input for each of said first plurality of experiments;

an outcomestore storing said at least one outputs on said medium; and a display capable of running on said computer, said display presenting an interpretation of a set of said at least one outputs extracted from said outcomestore, said display responsive to user input to alter said interpretation, to present an interpretation of a different set of said at least one outputs, or to cause said generator to perform a second plurality of experiments.

2. The system as described in claim 1, further comprising:

a dispatch capable of running on said computer, said computer being one of a plurality of networked computers, said dispatch causing a first experiment to run on a first of said networked computers and causing a second experiment to run on a second of said networked computers.

3. The system as described in claim 1, further comprising:

a dispatch capable of running on said computer, said dispatch causing each of said experiments to be run on a computer upon determining, by examining data in the outcomeStore, that the experiment has not previously been run.

4. The system as described in claim 1, wherein said process includes first and second sub-models such that each of said first plurality of experiments uses either said first sub-model or said second sub-model, said first sub-model responsive to first inputs, said second sub-model responsive to second inputs, wherein said generator automatically produces sets of said first inputs and automatically varies the values of said first inputs in each of said sets of said first inputs, wherein said generator automatically produces sets of said second inputs and automatically varies the values of said second inputs in each of said sets of said second inputs, and wherein said generator automatically provides a set of said first inputs for each of said first plurality of experiments using said fist sub-model and automatically provides a set of said second inputs for each of said first plurality of experiments using said second sub-model.

5. The system as described in claim 1, further comprising:
a second generator capable of running on said computer, said second generator automating a second performance of said first plurality of experiments and automatically varying said inputs for said first plurality of experiments according to a sampling or search strategy different than that used by said generator; and
a second outcomestore storing on said medium outputs produced by said second performance of said first plurality of experiments.

6. The system as described in claim 1, wherein said display presents a plotted representation of at least one dimension of a first set of said fist plurality of experiments using a first set of said at least one outputs, said system further comprising:
a user interface capable of running on said computer, said user interface including a control manipulable by a user to associate a value with an unplotted dimension of said first set of said first plurality of experiments, said display responsive to a manipulation of said control to (1) identify a second set of said at least one outputs produced by a second set of said first plurality of experiments performed using a substantial equivalent of said value as an input associated with said unplotted dimension, and to (2) present a plotted representation of at least one dimension of said second set of said first plurality of experiments using said second set of said at least one outputs.

7. The system as described in claim 1, wherein said display presents a plotted representation of at least one dimension of a first set of said first plurality of experiments using a first set of said at least one outputs, said system her comprising:
a user interface capable of running on said computer, said user interface including a control manipulable by a user to associate a value with an unplotted dimension of said first set of said first plurality of experiments, said display responsive to a manipulation of said control to (1) cause said generator to perform a second plurality of experiments using a substantial equivalent of said value as an input associated with said unplotted dimension to produce a second set of said at least one outputs, and to (2) present a plotted representation of at least one dimension of said second plurality of experiments using said second set of said at least one outputs.

8. The system as described in claim 1, further comprising:
a second generator capable of running on said computer, said second generator automating a second performance of said first plurality of experiments and automatically varying said inputs for said first plurality of experiments according to a sampling or search strategy different than that used by said generator.

9. The system as described in claim 1, wherein each of said first plurality of experiments can accept at least two inputs, a first of said at least two inputs providing a model, said model affecting the manner in which said process of at least one of said first plurality of experiments responds to a second of said at least two inputs.

10. The system as described in claim 1, wherein each of said plurality of experiments can accept at least two inputs, a first of said at least two inputs representing a set of models, one of said set of models selectable to affect the manner in which said process of at least one of said first plurality of experiments responds to a second of said at least two inputs.

11. The system as described in claim 1, wherein said outcomestore is a storage readable by a computer, further comprising:
a transformer performing a transformation upon at least a set of said at least one outputs in said outcomestore and thereby providing a second outcomestore storing transformed outputs.

12. The system as described in claim 1, wherein said outcomestore is a storage readable by a computer, further comprising:
a user interface presenting data representing a selectable range of values and responsive to a selection of said range of values to cause said generator to vary a value of said at least one input only within said range of values selected for experiments within said first plurality of experiments performed after said selection of said range of values.

13. The system as described in claim 1, wherein said outcomestore is a storage readable by a computer, wherein said process includes a variable model, and wherein said generator automatically selects and varies one or more model parts to complete each variable model of each process and provides said one or more model parts to each experiment as an input, each varied model part affecting the manner in which said process responds to at least one input.

14. A system for performing compound computational experiments, comprising:
a first plurality of experiments, each of said first plurality of experiments including at least one of a set of sub-models, each sub-model responsive to a set of input objects to produce a set of output objects, each sub-model adapted to apply a unique set of functions to input objects;
a generator automating the performance of said first plurality of experiments to produce a first group of sets of output objects, said generator automatically generating a set of input objects for use by each of said first plurality of experiments, said generator providing one of said set of sub-models for use by each of said first plurality of experiments; and
a display presenting an interpretation of at least a portion of said first group of sets of output objects, said display responsive to user input to alter said interpretation, to present an interpretation of a different portion of said group of sets of output objects, or to cause said generator to perform a second plurality of experiments.

15. The system as described in claim 14, wherein said generator automatically varies the sets of input objects used by said first plurality of experiments.

16. The system as described in claim 14, further comprising:

a storage including sets of experiment data and result data, said experiment data representing information about one of said first plurality of experiments, said result data representing information about a set of outputs produced by one of said first plurality of experiments.

17. The system as described in claim 14, wherein said generator uses a first search strategy to generate said sets of input objects, the system further comprising:

a second generator automating the performance of a third plurality of experiments, said second generator using a second search strategy to generate sets of input objects for each of said third plurality of experiments.

18. The system as described in claim 17, wherein said first search strategy comprises full factorial sampling.

19. The system as described in claim 17, wherein said first search strategy comprises Monte Carlo sampling.

20. The system as described in claim 17, wherein said first search strategy comprises a generational search based on a population size and a number of generations.

21. The system as described in claim 14, further comprising:

a user interface including a control manipulable by a user to (1) associate an explore value with a dimension of said first plurality of experiments, and to (2) cause said display to present an interpretation of a second group of sets of output objects, said second group of sets of output objects produced by each experiment in said first plurality of experiments performed using a substantial equivalent to said explore value for input objects associated with said dimension.

22. The system as described in claim 14, further comprising:

a user interface including a control manipulable by a user to (1) associate an explore value with a dimension of said first plurality of experiments, to (2) cause said generator to perform a second plurality of experiments using a substantial equivalent to said explore value for input objects associated with said dimension, and to (3) cause said display to present an interpretation of a second group of sets of output objects produced by said second plurality of experiments.

23. The system as described in claim 22, further comprising:

a storage including sets of experiment data and result data, said experiment data representing information about one of said second plurality of experiments, said result data representing information about a set of outputs produced by one of said second plurality of experiments.

24. The system as described in claim 14, wherein a first of said first plurality of experiments is run on a first computer and a second of said first plurality of experiments is run on a second computer coupled to said first computer.

25. The system as described in claim 24, wherein said first of said first plurality of experiments runs on said first computer while said second of said first plurality of experiments runs on said second computer.

26. The system as described in claim 14, wherein each set of input objects generated for said first plurality of experiments is associated with one experiment in said first plurality of experiments and is also associated with a set of output objects produced by said one experiment, said system further comprising:

a filter comparing a set of output objects or an associated set of input objects to one or more predetermined values or ranges of values to select said second plurality of experiments.

27. A method of performing compound computational experiments, comprising:

automatically performing a first plurality of experiments, each of said first plurality of experiments including a process responsive to a set of input objects to produce a set of output objects;

automatically varying sets of input objects for a plurality of said processes;

storing each of said sets of output objects as a first group of sets of output objects;

presenting an interpretation of a portion of said first group of sets of output objects; and responding to user input by altering said interpretation, by presenting an interpretation of a second portion of said first group of sets of output objects or by performing a second plurality of experiments.

28. The method of claim 27, wherein said interpretation is a plotted representation of at least one dimension of a first set of said first plurality of experiments, further comprising:

associating a value with an unplotted dimension of said first set of said first plurality of experiments;

identifying a second set of said at least one outputs produced by a second set of said first plurality of experiments performed using a substantial equivalent of said value as an input associated with said unplotted dimension; and presenting a plotted representation of at least one dimension of said second set of said first plurality of experiments using said second set of said at least one outputs.

29. The method of claim 28, further comprising:

performing a first of said first plurality of experiments using a first computer; and performing a second of said first plurality of experiments using a second computer connected to said first computer.

30. The method of claim 28, further comprising:

examining sets of output objects to determine that each of said second plurality of experiments has not been previous performed; and performing each of said second plurality of experiments upon determining it has not been previously performed.

31. The method of claim 27, wherein said interpretation is a plotted representation of at least one dimension of a first set of said first plurality of experiments, further comprising:

associating a value with an unplotted dimension of said first set of said first plurality of experiments;

performing a second plurality of experiments using a substantial equivalent of said value as an input associated with said unplotted dimension to produce a second set of said at least one outputs; and presenting a plotted representation of at least one dimension of said second plurality of experiments using said second set of said at least one outputs.

32. A process for performing a compound computational experiment, comprising:

automatically performing a first plurality of experiments to produce a first group of sets of output objects, each of said first plurality of experiments including at least one of a set of sub-models, each sub-model responsive to a set of input objects to produce a set of output objects, each sub-model adapted to apply a unique set of functions to input objects;

generating a set of input objects for use by each of said first plurality of experiments;

providing one of said set of sub-models for use by each of said first plurality of experiments;

presenting an interpretation of at least a portion of said first group of sets of output objects; and responding to user input to alter said interpretation, to present an interpretation of a different portion of said group of sets of output objects, or to perform a second plurality of experiments.

33. The process for performing a compound computational experiment described in claim 32, further comprising:

varying said sets of input objects used by said first plurality of experiments.

34. The process for performing a compound computational experiment described in claim 32, further comprising:

storing associated sets of experiment data and result data, said experiment data representing information about one of said first plurality of experiments, said result data representing information about a set of outputs produced by one of said first plurality of experiments.

35. The process for performing a compound computational experiment described in claim 32, further comprising:

selecting a second plurality of experiments by comparing a set of output objects or a set of input objects to one or more predetermined values or ranges of values.

36. The process for performing a compound computational experiment described in claim 32, further comprising:

producing a second group of sets of output objects by applying a transformation to said first group of sets of output objects; and presenting an interpretation of at least a portion of said second group of sets of output objects.

37. The process for performing a compound computational experiment described in claim 32, wherein said interpretation is a plotted representation of at least one dimension of a first set of said first plurality of experiments, further comprising:

associating a value with an unplotted dimension of said first set of said first plurality of experiments;

identifying a second group of sets of output objects produced by a second set of said first plurality of experiments performed using a substantial equivalent of said value in an input object associated with said unplotted dimension; and presenting a plotted representation of at least one dimension of said second set of said first plurality of experiments using said second group of sets of output objects.

38. The process for performing a compound computational experiment described in claim 32, wherein said interpretation is a plotted representation of at least one dimension of a first set of said first plurality of experiments, further comprising:

associating a value with a unplotted dimension of said first set of said first plurality of experiments;

producing a second group of sets of output objects by performing a second plurality of experiments using a substantial equivalent of said value in an input object associated with said unplotted dimension; and presenting a plotted representation of at least one dimension of said second plurality of experiments using said second group of sets of output objects.

39. The process for performing a compound computational experiment described in claim 32, wherein at least one of said input objects represents a result from a second compound computational experiment.

40. The process for performing a compound computational experiment described in claim 39, wherein said second compound computational experiment differs from said compound computation experiment.

41. The process for performing a compound computational experiment described in claim 32, wherein a plurality of said set of input objects are derived from results of a third plurality of experiments.

42. A method of performing compound computational experiments, comprising:

a step for performing a first plurality of experiments to produce a first group of sets of output objects;

a step for automatically generating input objects used by each of said first plurality of experiments;

a step for automatically varying some of said input objects;

a step for selecting and providing a model used by each of said first plurality of experiments, said model affecting the manner in which a respective one of said first plurality of experiments responds to input objects;

a step for presenting a plotted representation of at least one dimension of a first set of said first plurality of experiments;

a step for associating a value with an unplotted dimension of said first set of said first plurality of experiments;

a step for producing a second group of sets of output objects by performing a second plurality of experiments using a substantial equivalent of said value in input objects associated with said unplotted dimension; and a step for presenting a plotted representation of at least one dimension of said second plurality of experiments using said second group of sets of output objects.

43. A method of performing compound computational experiments, comprising:

a step for performing a first plurality of experiments to produce a first group of sets of output objects;

a step for automatically generating input objects used by each of said first plurality of experiments;

a step for automatically varying some of said input objects;

a step for selecting and providing a model used by each of said first plurality of experiments, said model affecting the manner in which a respective one of said first plurality of experiments responds to input objects;

a step for presenting a plotted representation of at least one dimension of a first set of said first plurality of experiments;

a step for associating a value with an unplotted dimension of said first set of said first plurality of experiments;

a step for identifying a second group of sets of output objects produced by a second set of said first plurality of experiments performed using a substantial equivalent of said value in input objects associated with said unplotted dimension; and a step for presenting a plotted representation of at least one dimension of said first plurality of experiments using said second group of sets of output objects.

* * * * *